FLIP-FLOP

"AND" GATES

"OR" GATES

INVERTER

AMPLIFIER

LIMITER

DELAY CIRCUIT

SINGLE-SHOT MULTIVIBRATOR

RING COUNTER

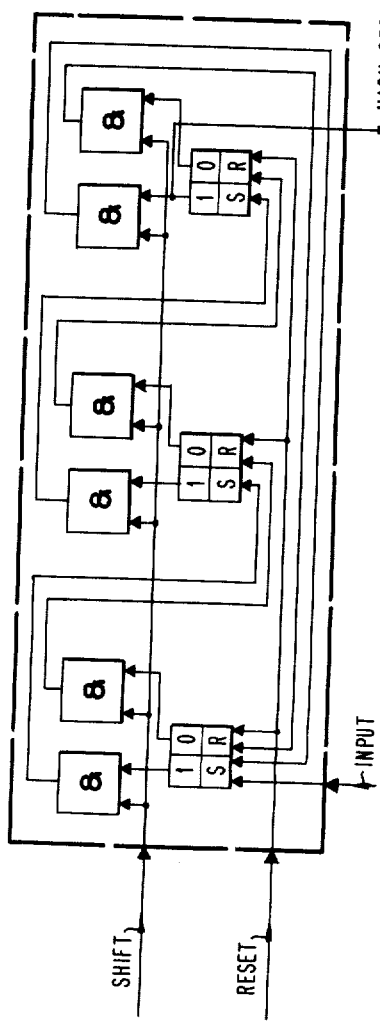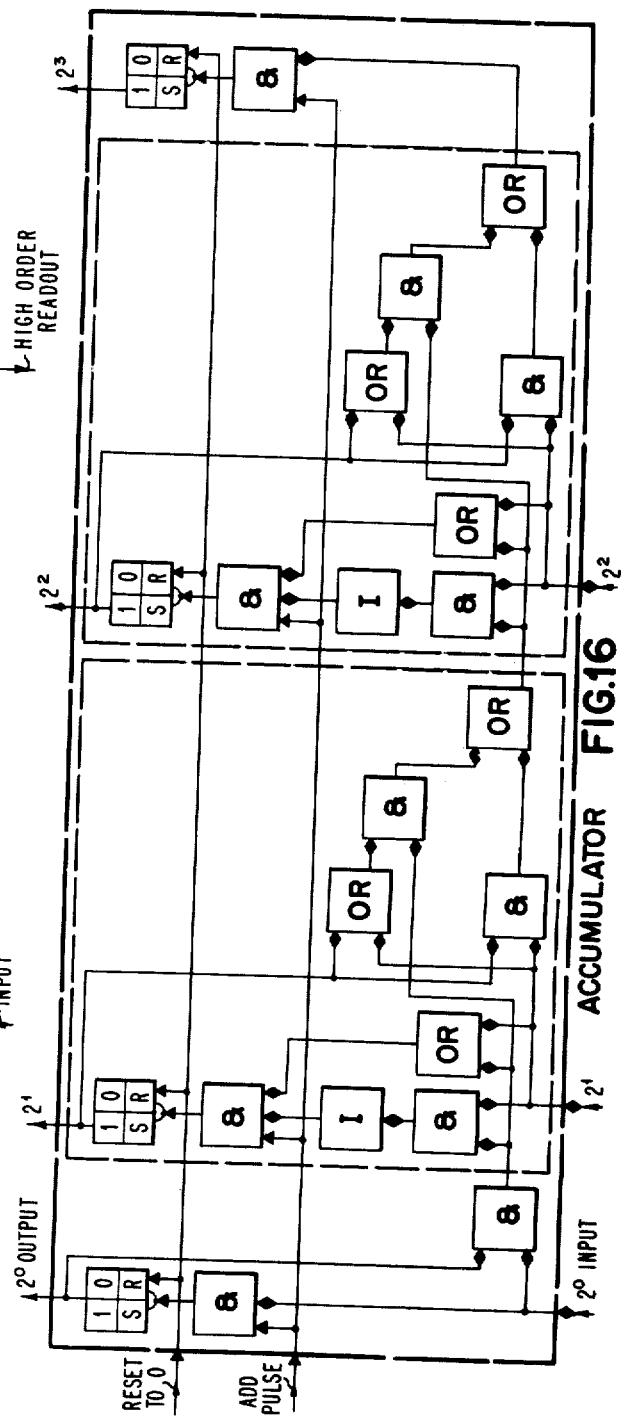

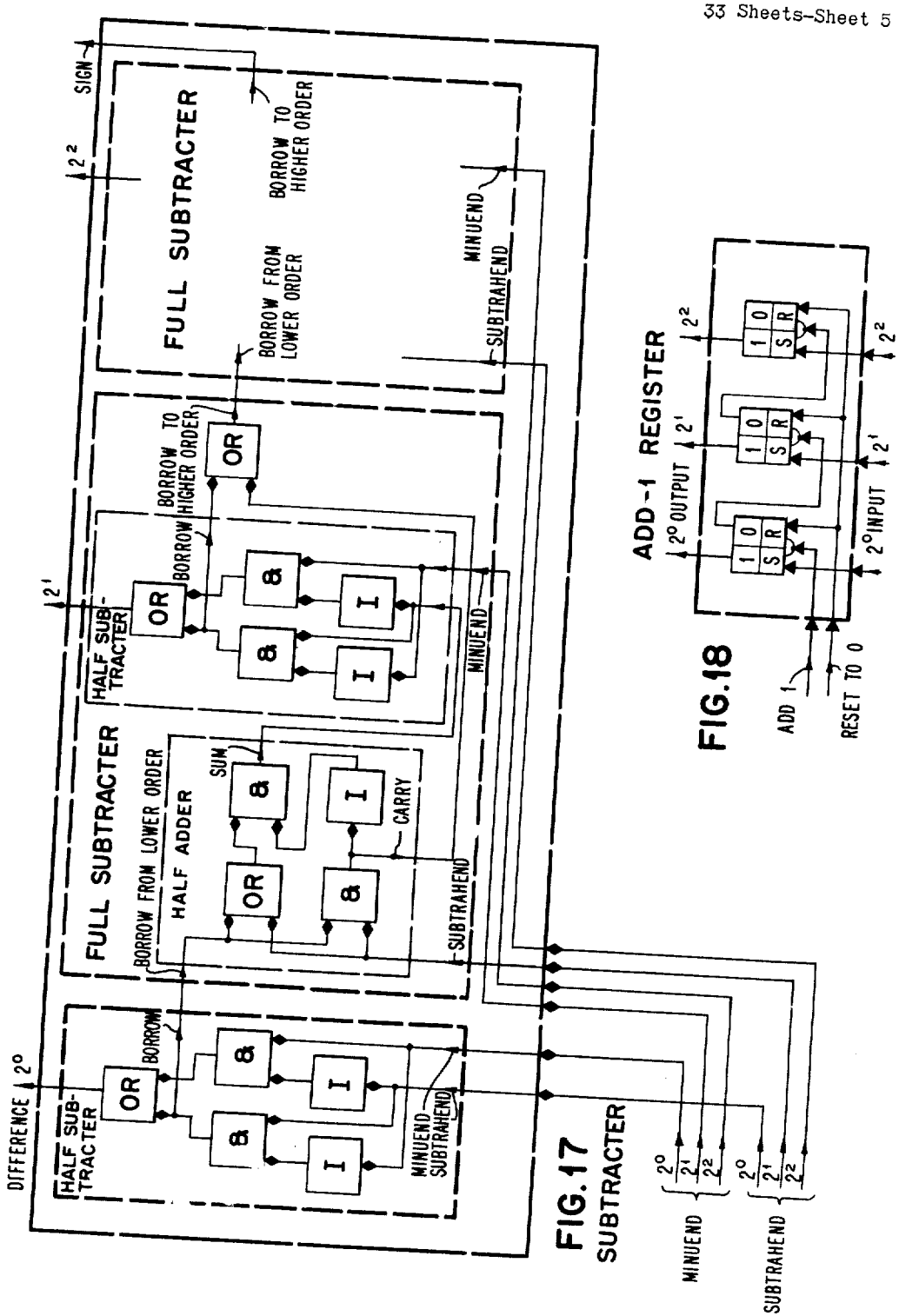

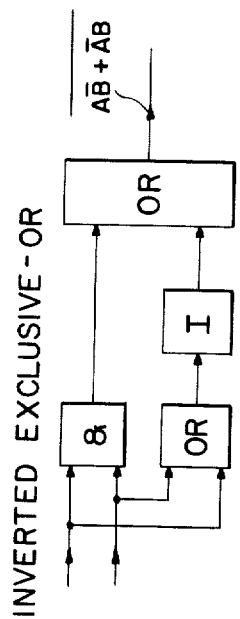
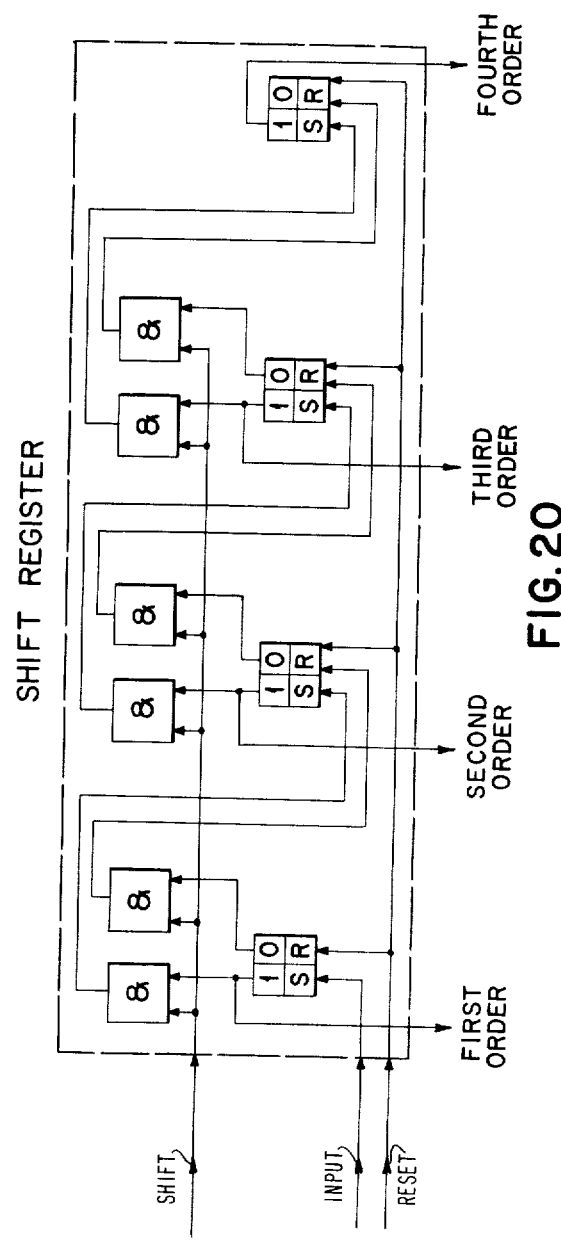

Nov. 24, 1964  H. B. BASKIN  3,158,840
SPECIMEN IDENTIFICATION APPARATUS AND METHOD
Filed Jan. 15, 1962  33 Sheets-Sheet 7
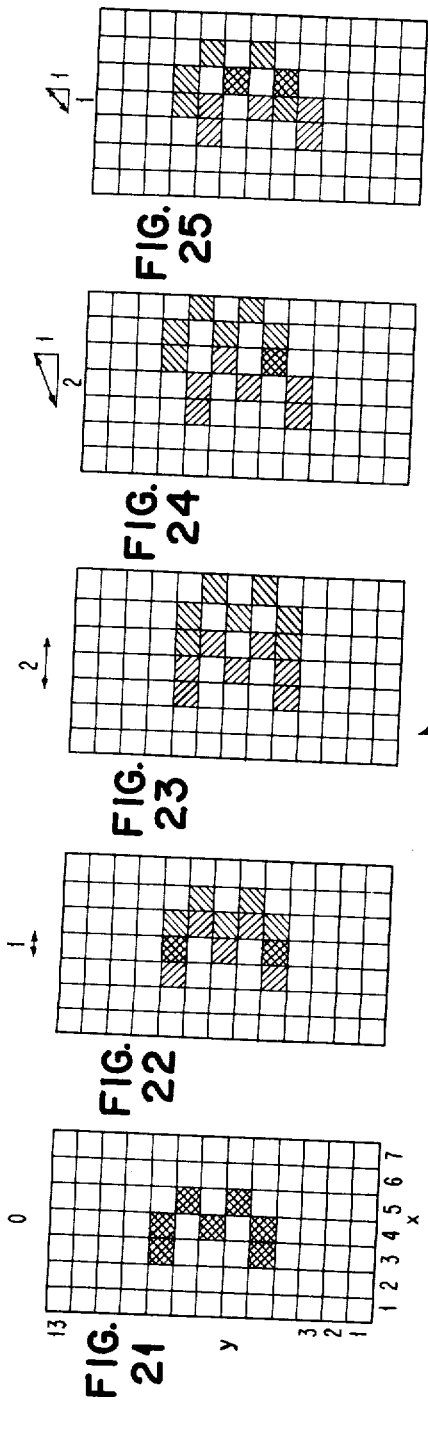
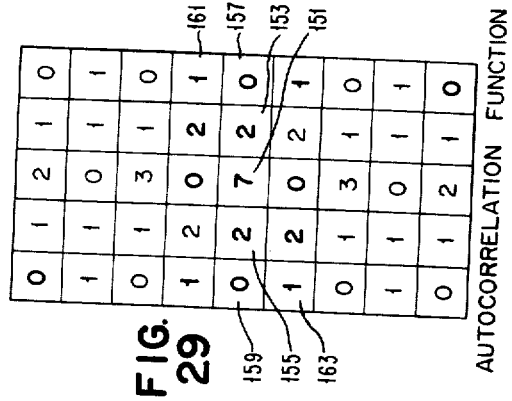
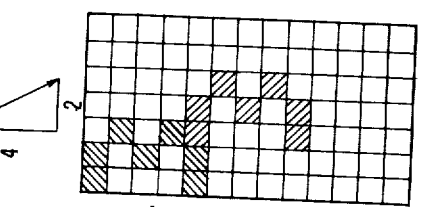
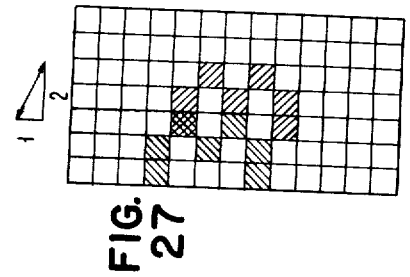
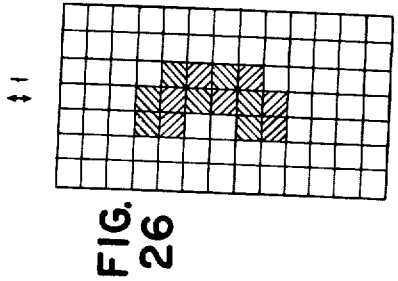

Nov. 24, 1964   H. B. BASKIN   3,158,840
SPECIMEN IDENTIFICATION APPARATUS AND METHOD
Filed Jan. 15, 1962   33 Sheets-Sheet 11

FIG. 31

NORMALIZED COMPARISON

| INPUT PATTERN | REFERENCE PATTERN | | | | | | | | | |
|---|---|---|---|---|---|---|---|---|---|---|
| | 1 | 2 | 3 | 4 | 5 | 6 | 7 | 8 | 9 | 0 |
| 1 | 9.22 | 5.86 | 5.23 | 7.49 | 6.15 | 6.18 | 7.06 | 6.26 | 6.95 | 6.21 |
| 2 | 8.24 | 12.96 | 10.63 | 11.37 | 11.41 | 12.23 | 11.55 | 12.24 | 10.88 | 10.68 |
| 3 | 6.18 | 8.95 | 10.91 | 8.46 | 9.82 | 8.80 | 9.08 | 9.46 | 8.46 | 8.08 |
| 4 | 11.71 | 12.65 | 11.18 | 14.42 | 12.80 | 13.60 | 12.83 | 12.90 | 13.60 | 12.41 |
| 5 | 10.52 | 13.89 | 14.21 | 14.01 | 15.78 | 14.28 | 14.03 | 14.55 | 14.11 | 12.56 |
| 6 | 10.74 | 15.12 | 12.93 | 15.12 | 14.51 | 16.03 | 14.58 | 14.83 | 14.51 | 14.29 |
| 7 | 8.35 | 9.72 | 9.08 | 9.71 | 9.70 | 9.92 | 10.91 | 9.75 | 9.47 | 9.53 |
| 8 | 14.43 | 20.06 | 18.43 | 19.00 | 19.58 | 19.65 | 18.98 | 21.24 | 19.24 | 18.04 |
| 9 | 14.97 | 16.66 | 15.40 | 18.72 | 17.74 | 17.96 | 17.23 | 17.99 | 19.85 | 17.32 |
| 0 | 9.33 | 11.42 | 10.27 | 11.93 | 11.03 | 12.35 | 12.10 | 11.77 | 12.09 | 13.86 |

FIG. 32

NORMALIZED "SECOND-DIFFERENCE" COMPARISON

| INPUT PATTERN | REFERENCE PATTERN | | | | | | | | | |
|---|---|---|---|---|---|---|---|---|---|---|
| | 1 | 2 | 3 | 4 | 5 | 6 | 7 | 8 | 9 | 0 |
| 1 | 23.58 | 5.19 | 3.35 | 17.73 | 6.96 | 7.66 | 11.52 | 9.76 | 17.88 | 9.70 |
| 2 | 7.97 | 36.22 | 15.10 | 19.07 | 15.59 | 29.90 | 18.21 | 28.82 | 12.86 | 15.25 |
| 3 | 5.68 | 16.68 | 40.00 | 12.87 | 28.94 | 14.32 | 20.00 | 27.75 | 14.13 | 17.37 |
| 4 | 15.78 | 11.04 | 6.75 | 20.98 | 10.01 | 14.78 | 11.52 | 11.74 | 14.53 | 10.86 |
| 5 | 10.26 | 14.96 | 25.15 | 16.59 | 34.76 | 17.45 | 19.64 | 21.10 | 20.76 | 10.66 |
| 6 | 9.75 | 24.79 | 10.75 | 21.17 | 15.08 | 30.03 | 19.01 | 19.01 | 14.60 | 17.32 |
| 7 | 10.94 | 4.26 | 11.20 | 12.30 | 12.66 | 14.18 | 22.41 | 12.05 | 13.43 | 15.81 |
| 8 | 16.29 | 31.31 | 27.30 | 22.03 | 23.88 | 24.91 | 21.16 | 39.34 | 22.43 | 21.57 |
| 9 | 22.65 | 10.60 | 10.55 | 20.69 | 17.84 | 14.52 | 18.57 | 17.03 | 29.87 | 14.09 |
| 0 | 16.29 | 16.68 | 17.20 | 20.50 | 12.14 | 22.84 | 27.94 | 20.71 | 18.68 | 39.60 |

Nov. 24, 1964    H. B. BASKIN    3,158,840
SPECIMEN IDENTIFICATION APPARATUS AND METHOD
Filed Jan. 15, 1962    33 Sheets-Sheet 12

FIG. 33a

IDEAL FONT

MEASURE OF SIMILARITY
TO IDEAL FONT

A    1.000
B    0.930
R    0.930

IDEAL FONT WITH
DELETION NOISE

MEASURE OF SIMILARITY
TO IDEAL FONT

A    0.940
B    0.855
R    0.852

IDEAL FONT WITH
ADDITIVE NOISE

MEASURE OF SIMILARITY
TO IDEAL FONT

A    0.972
B    0.953
R    0.957

Nov. 24, 1964  H. B. BASKIN  3,158,840
SPECIMEN IDENTIFICATION APPARATUS AND METHOD
Filed Jan. 15, 1962  33 Sheets-Sheet 13

FIG. 33b

IDEAL FONT

MEASURE OF SIMILARITY TO IDEAL FONT
A  0.930
B  0.982
R  1.000

IDEAL FONT WITH DELETION NOISE

MEASURE OF SIMILARITY TO IDEAL FONT
A  0.888
B  0.928
R  0.944

IDEAL FONT WITH ADDITIVE NOISE

MEASURE OF SIMILARITY TO IDEAL FONT
A  0.920
B  0.952
R  0.967

Nov. 24, 1964 H. B. BASKIN 3,158,840
SPECIMEN IDENTIFICATION APPARATUS AND METHOD
Filed Jan. 15, 1962 33 Sheets-Sheet 14

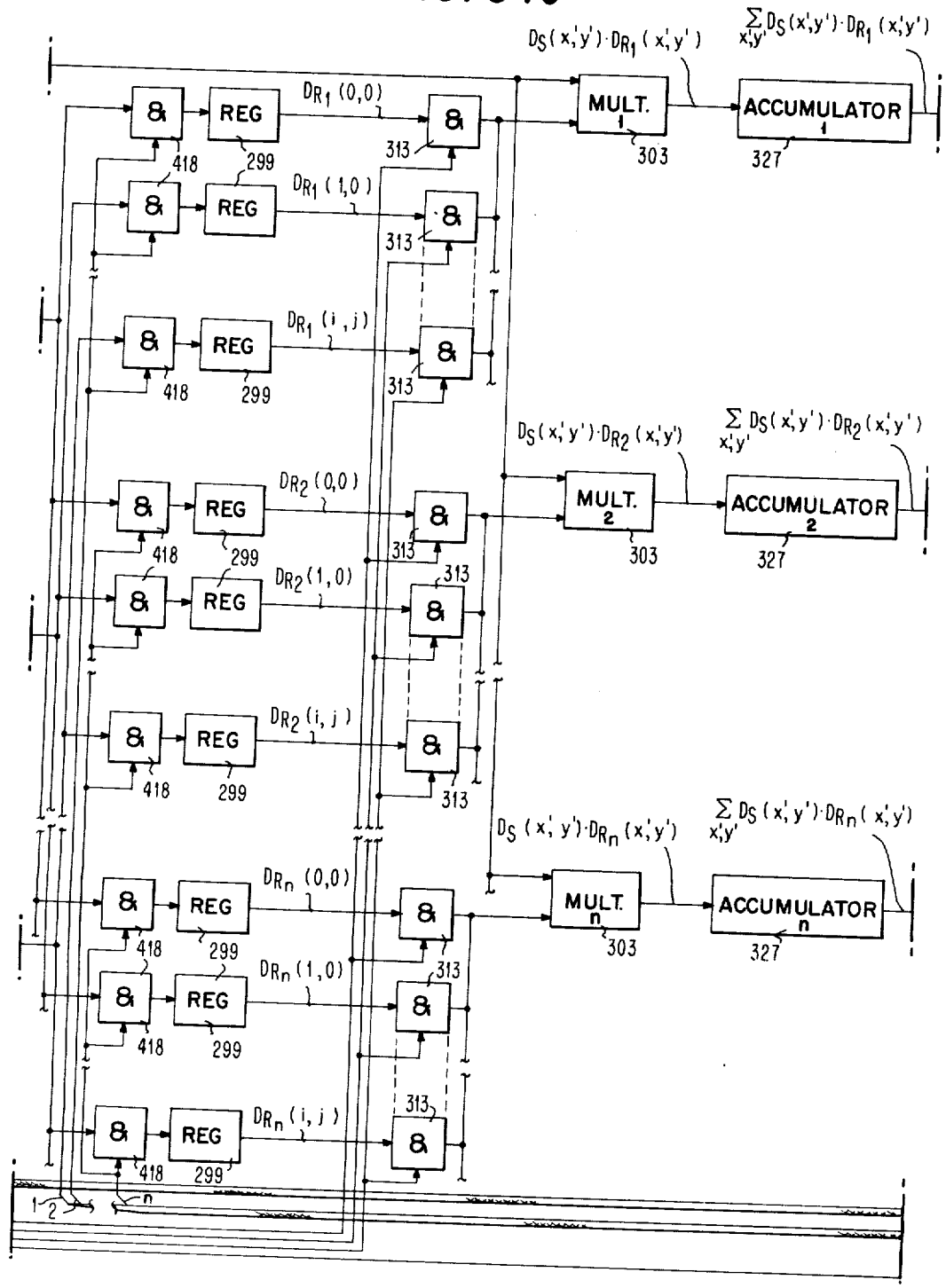

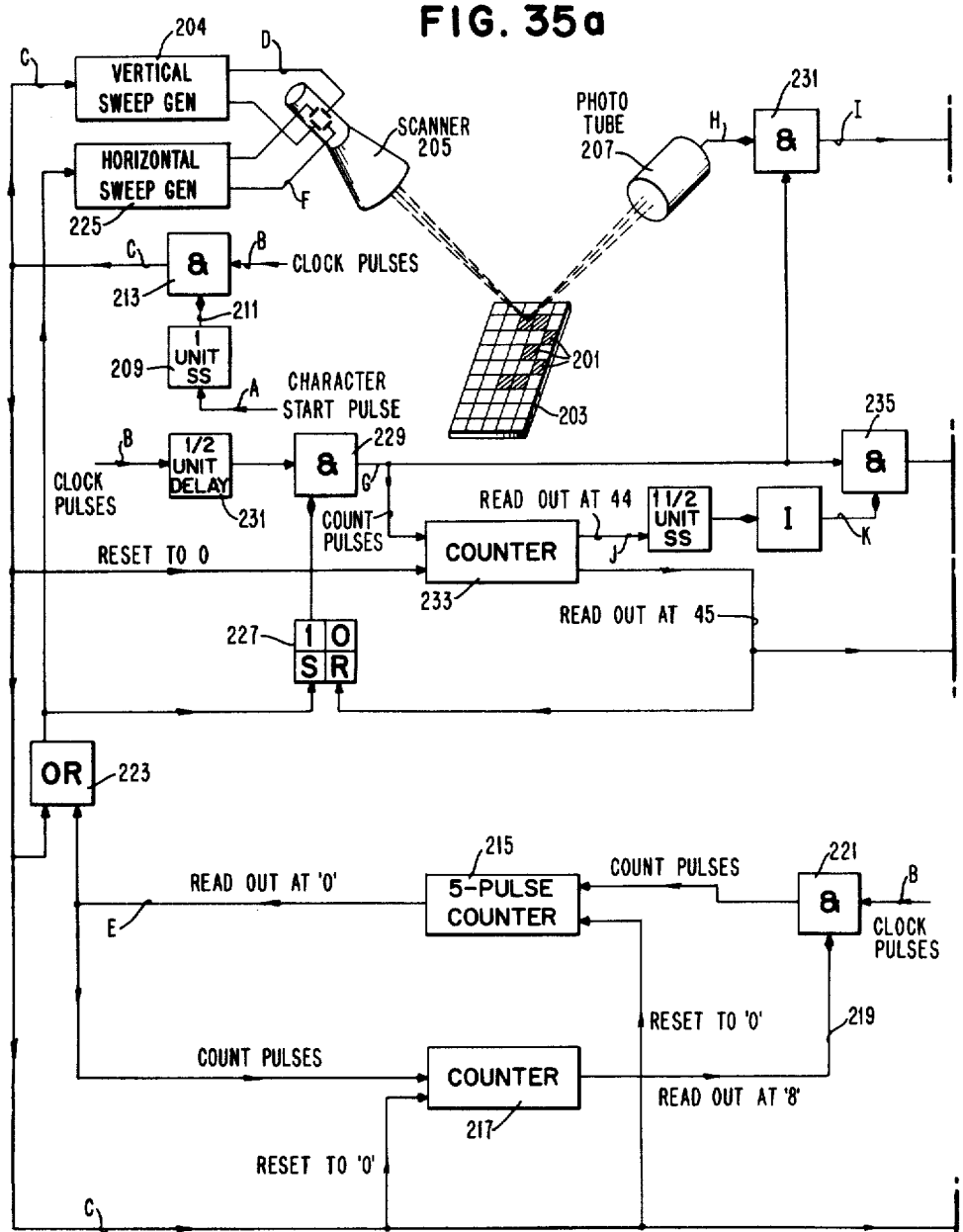

Nov. 24, 1964   H. B. BASKIN   3,158,840
SPECIMEN IDENTIFICATION APPARATUS AND METHOD
Filed Jan. 15, 1962   33 Sheets-Sheet 19

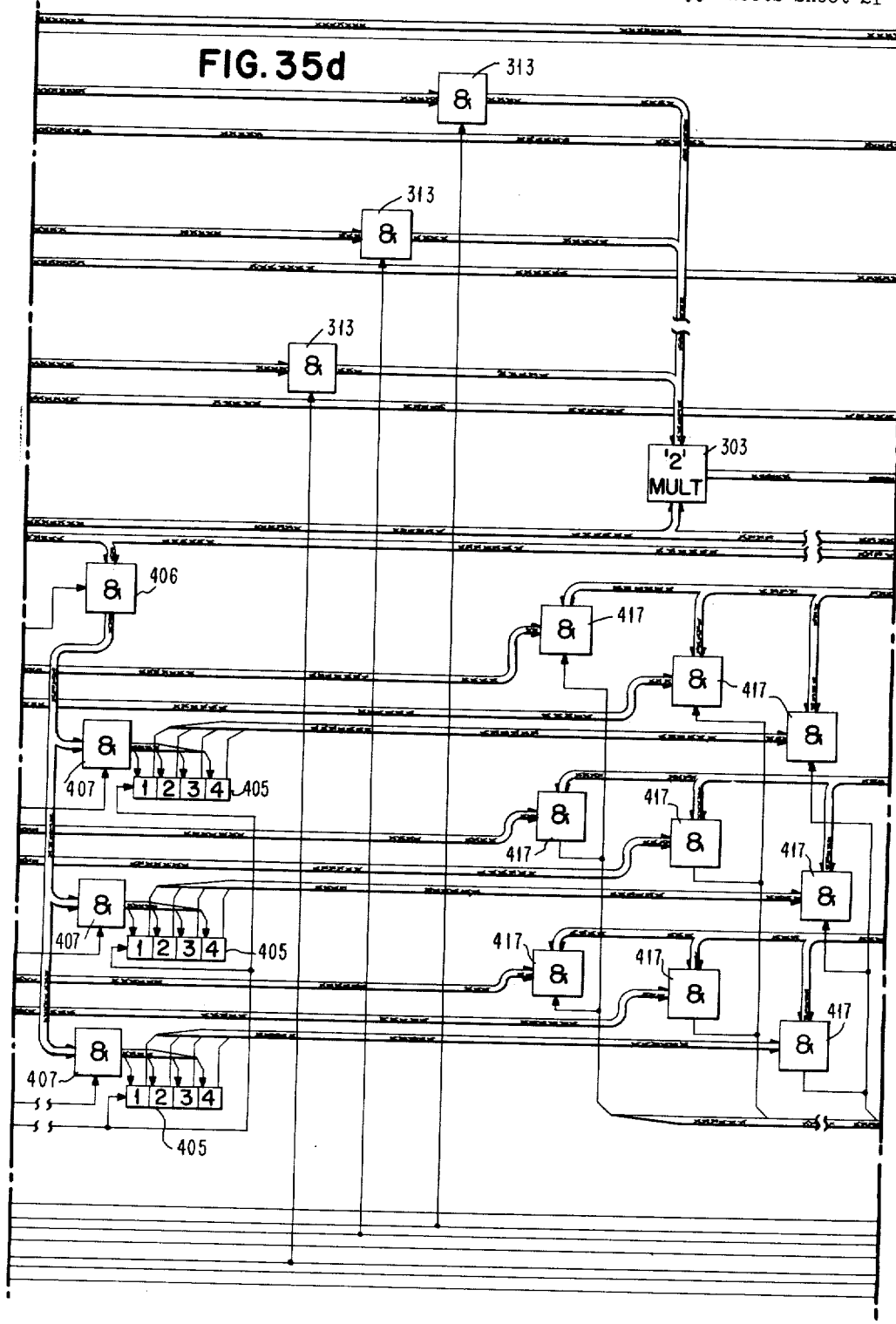

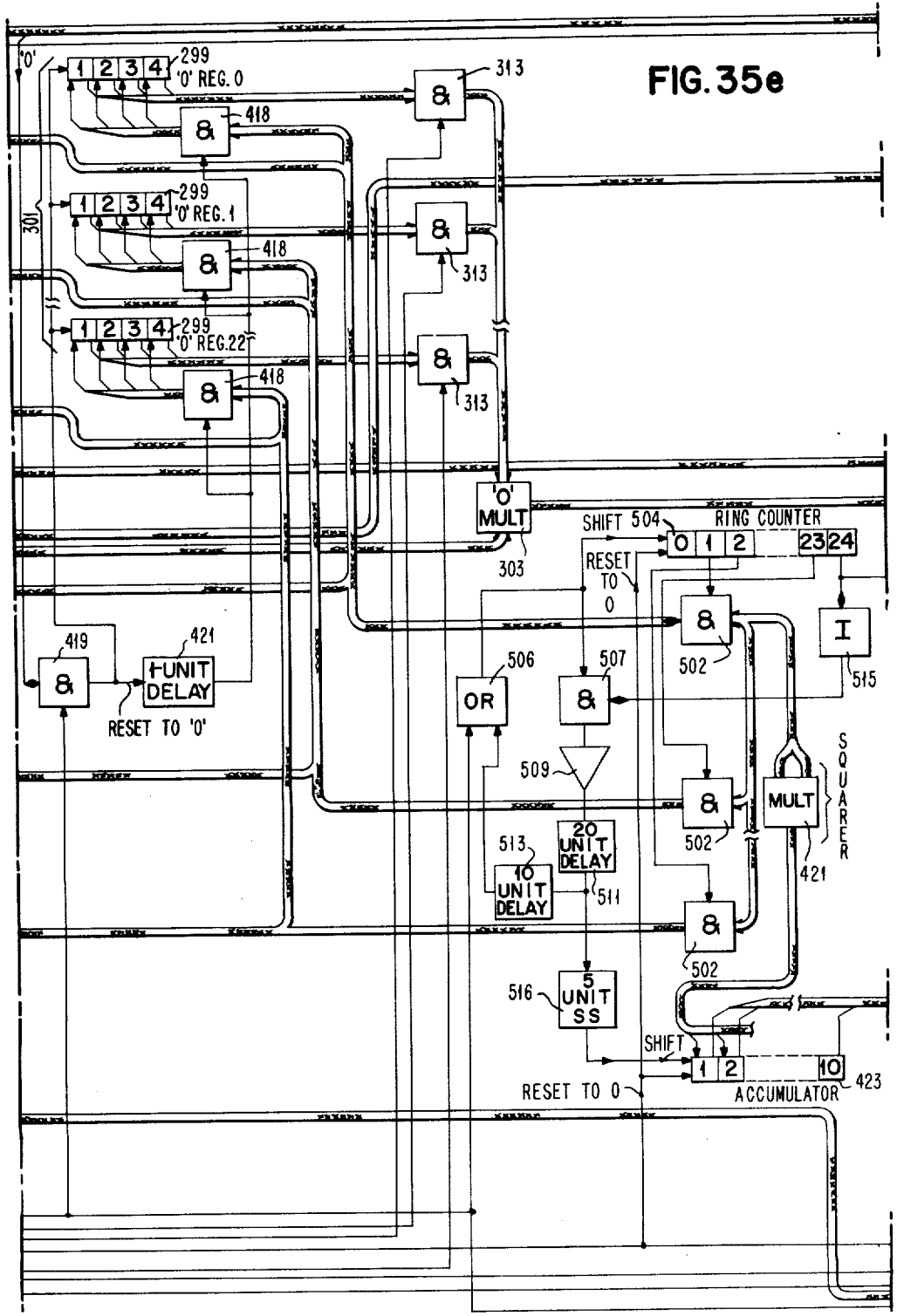

Nov. 24, 1964  H. B. BASKIN  3,158,840
SPECIMEN IDENTIFICATION APPARATUS AND METHOD
Filed Jan. 15, 1962  33 Sheets-Sheet 23

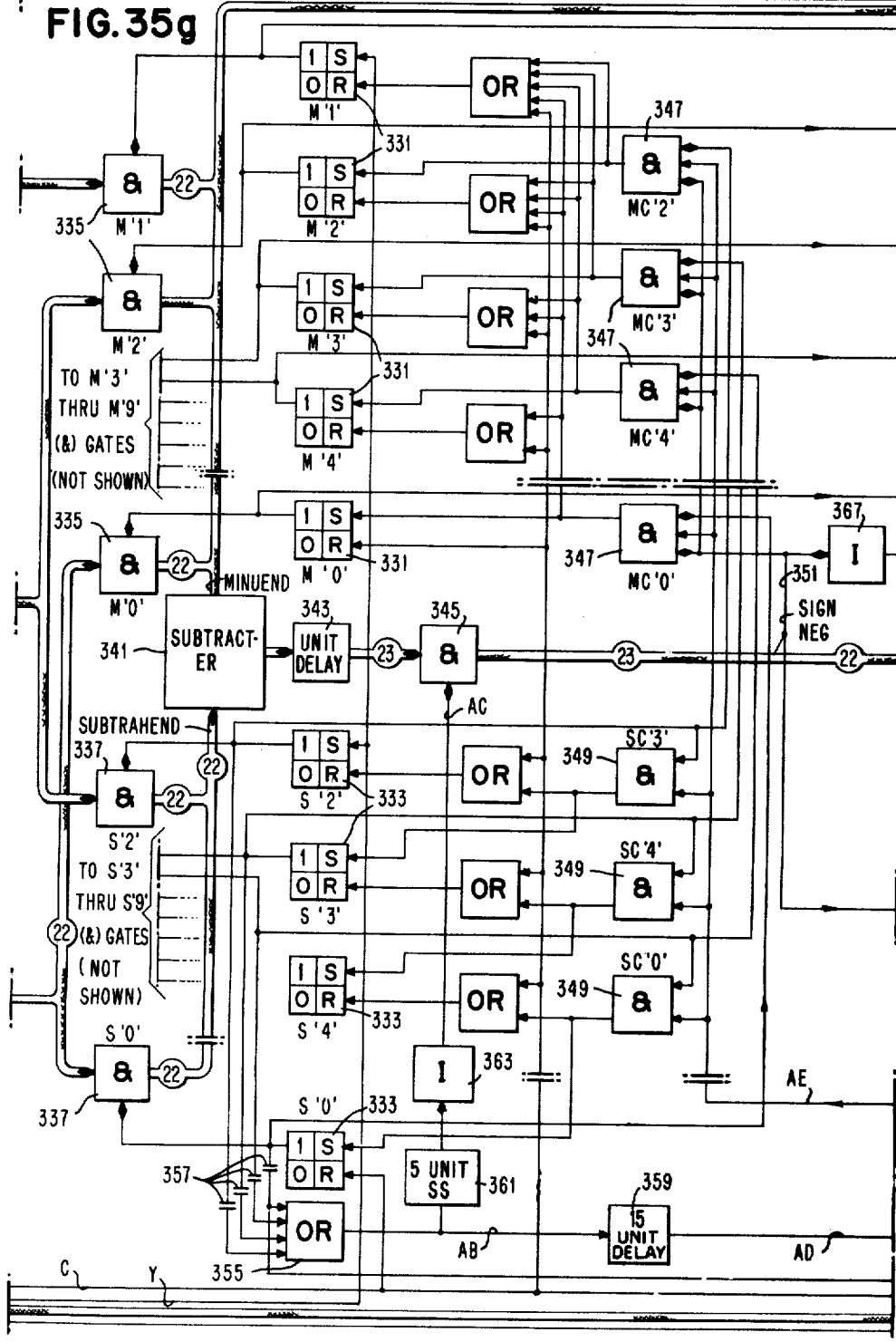

Nov. 24, 1964     H. B. BASKIN     3,158,840
SPECIMEN IDENTIFICATION APPARATUS AND METHOD
Filed Jan. 15, 1962     33 Sheets-Sheet 26

Nov. 24, 1964     H. B. BASKIN     3,158,840
SPECIMEN IDENTIFICATION APPARATUS AND METHOD
Filed Jan. 15, 1962     33 Sheets-Sheet 27

Nov. 24, 1964   H. B. BASKIN   3,158,840
SPECIMEN IDENTIFICATION APPARATUS AND METHOD
Filed Jan. 15, 1962

Nov. 24, 1964   H. B. BASKIN   3,158,840
SPECIMEN IDENTIFICATION APPARATUS AND METHOD
Filed Jan. 15, 1962   33 Sheets-Sheet 29
23 SHIFT
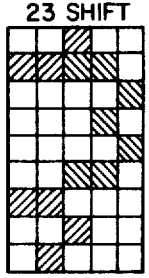
| ROW 1 | ROW 2 | ROW 3 | ROW 4 | ROW 5 | ROW 6 | ROW 7 | ROW 8 | ROW 9 |
|---|---|---|---|---|---|---|---|---|
| 000000 | 011000 | 001100 | 010000 | 010011 | 100000 | 000000 | 000000 | 000000 |
001001100000000000000000000000110000010001000
FIG.41
44 SHIFT
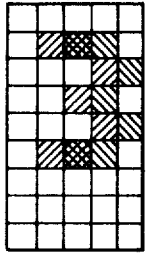
000000011000001100010000010011100000000000000000
000000110000010001100000100111000000000000000000
FIG.42
45 SHIFT
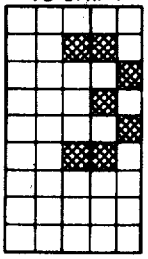
000000011000001100010000010011100000000000000000
000000011000001100010000010011100000000000000000
FIG.43
AUTOCORRELATION TABLE
| 23 | 24 | 25 | 26 | 27 |
|---|---|---|---|---|
| 0 | 1 | 2 | 1 | 0 |
| 28 | 29 | 30 | 31 | 32 |
| 1 | 1 | 0 | 1 | 1 |
| 33 | 34 | 35 | 36 | 37 |
| 0 | 1 | 3 | 1 | 0 |
| 38 | 39 | 40 | 41 | 42 |
| 1 | 2 | 0 | 2 | 1 |
| 43 | 44 | 0 | 1 | 2 |
| 0 | 2 | 7 | 2 | 0 |
| 3 | 4 | 5 | 6 | 7 |
| 1 | 2 | 0 | 2 | 1 |
| 8 | 9 | 10 | 11 | 12 |
| 0 | 1 | 3 | 1 | 0 |
| 13 | 14 | 15 | 16 | 17 |
| 1 | 1 | 0 | 1 | 1 |
| 18 | 19 | 20 | 21 | 22 |
| 0 | 1 | 2 | 1 | 0 |
FIG.44

Nov. 24, 1964          H. B. BASKIN          3,158,840
SPECIMEN IDENTIFICATION APPARATUS AND METHOD
Filed Jan. 15, 1962                    33 Sheets-Sheet 31

Nov. 24, 1964  H. B. BASKIN  3,158,840
SPECIMEN IDENTIFICATION APPARATUS AND METHOD
Filed Jan. 15, 1962  33 Sheets-Sheet 32

United States Patent Office 3,158,840
Patented Nov. 24, 1964

3,158,840
SPECIMEN IDENTIFICATION APPARATUS
AND METHOD
Herbert B. Baskin, Mohegan Lake, N.Y., assignor to International Business Machines Corporation, New York, N.Y., a corporation of New York
Filed Jan. 15, 1962, Ser. No. 166,211
10 Claims. (Cl. 340—172.5)

This invention relates to specimen identification systems and, in particular, to adaptive techniques for altering reference storage in identification systems when individual specimens are incorrectly-identified or rejected but are part of identifiable sequences of specimens.

The invention is applicable to many types of specimen identification systems but is embodied in a character recognition system and, more particularly, in conjunction with a system using autocorrelation function techniques as shown in the following U.S. patent applications: Serial Number 45,034 filed July 25, 1960, by L. P. Horwitz and G. L. Shelton, Jr., entitled Specimen Identification Apparatus and Method; Serial Number 64,568, filed October 24, 1960, by L. P. Horwitz and G. L. Shelton, Jr., entitled Optical Specimen Identification Filtering Techniques; Serial Number 118,124 filed June 19, 1961, by H. H. Goldstine, L. P. Horwitz and G. L. Shelton, Jr., entitled Specimen Identification Apparatus and Methods; Serial Number 76,909 filed December 19, 1960, by W. McDermid, H. E. Petersen and G. L. Shelton, Jr., entitled Unambiguous Identification Systems; Serial Number 93,070 filed March 3, 1961, by L. P. Horwitz and G. L. Shelton, Jr., entitled Specimen Identification Apparatus and Method; Serial Number 115,501 filed June 7, 1961, by J. Reines, L. P. Horwitz and G. L. Shelton, Jr., entitled Specimen Identification Apparatus and Methods; and Serial Number 166,180 filed on January 15, 1962, by Maxwell C. Andrews, entitled Specimen Identification Apparatus and Method.

Identification techniques, including those based on autocorrelation functions, provide an indication of the identity of the specimen character based on a comparison of the specimen with a set of references. This indication is often based on a "best-match" principle and may operate in a satisfactory manner for specimens that exactly or closely match a member of the set of references. Many documents contain specimens that deviate in font and quality to an extent that some cannot be recognized by the identification system. In the present invention a radically new approach to this problem is pursued, wherein the stored set of references is altered when a specimen deviates from a reference pattern. This is accomplished by identifying the specimens in groups, where a group may include an entire word. The term "word" as used hereinafter, is defined as any group or sequence of specimen characters. When the system is capable of identifying an overall word but senses that all characters in the sequence do not correspond to the characters in an ideal or reference word, a correction signal is generated which alters the stored data corresponding to the reference pattern which appears in the ideal word. For example, if the word "THINK" were identified to contain the character sequence "THIMK" (meaning that the specimen "N" had more similarity to the stored reference "M" than "N") the stored reference "N" would be altered so that future specimens "N" would be correctly-identified. Thus, when a sequence of characters does not coincide with an ideal word, but is sufficiently similar to an ideal word to permit the word to be identified, the stored reference corresponding to the character in the ideal word that was incorrectly-identified is altered. This correction enables the system to subsequently distinguish between pairs of words which would otherwise be incorrectly-identified. For example, if the above sample correction were made, the specimen word "NAP" would be subsequently correctly-identified. If this correction were not made the word would be incorrectly-identified as "MAP." In this manner, the system adapts itself to changes in font and quality, in many cases, before system failure occurs.

A primary object of the present invention is to provide adaptive techniques in a specimen identification system.

Another object is to provide adaptive techniques for identifying printed patterns, including characters.

A further object is to provide techniques for altering the reference patterns in specimen identification systems where a sequence of specimens is identifiable as a word but where some specimens are incorrectly-identified or rejected.

A still further object is to provide adaptive techniques for specimen identification systems which use autocorrelation function comparison.

Another object is to provide adaptive techniques for specimen identification systems which use comparison of functions of autocorrelation functions.

A further object is to provide techniques for altering reference pattern storage in those specimen identification systems that utilize comparison of functions of autocorrelation functions, where sequences of specimens are identifiable as words but where some specimens are incorrectly-identified or rejected.

A further object is to provide techniques for altering reference pattern storage in those specimen identification systems that utilize comparison of functions of autocorrelation functions, where sequences of specimens are identifiable as words but where some specimens are incorrectly-identified or rejected, where the alterations consist of substitutions of the functions of the autocorrelation functions of the incorrectly-identified or rejected specimens in place of the functions of the autocorrelation functions of the reference patterns corresponding to the correct identities of these specimens.

The foregoing and other objects, features and advantages of the invention will be apparent from the following more particular description of the invention.

In accordance with a preferred embodiment of the invention, an autocorrelation function of the specimen is generated electronically and compared with autocorrelation functions of reference patterns to provide an indication of the identity of the specimens. A series of identified specimens are then identified as a word. Some words are stored with alternate choices of specimen sequences when no ambiguity is caused. This permits word identification even though some specimens are incorrectly-identified or rejected. The autocorrelation functions of reference patterns are altered after recognition when words are unambiguously identified but are found to contain incorrectly-identified specimens or rejected.

The autocorrelation function is a measure of the correlation of a function with itself and is thus inherently registration invariant. If the specimen to be identified is considered to be a matrix of discrete areas having co-ordinates $(x, y)$ that are predominately black or predominately white, depending then upon the positions of the lines that the specimen comprises, there is a function $f(x, y)$ that is "1" for each instance where the area about the coordinates $(x, y)$ is black "0" where white. The autocorrelation function defines the number of pairs of black areas separated by a given distance in a given direction, over all distances and directions. If $(x, y)$ is a point on the pattern, and $(x+x', y+y')$ is another point on the pattern separated from the point $(x, y)$ by $(x', y')$, then the product $(x, y)(x+x', y+y')=1$ only where both points are black. Since this procedure is performed on every pair of points in the specimen pattern S, the autocorrelation function $D_S(x', y')$ is defined as:

$$D_S(x', y') = \sum_{x, y} f(x, y) f(x+x', y+y')$$

The autocorrelation function $D_S(x', y')$ of the specimen "S" is then compared point-by-point, to the autocorrelations $D_R(x', y')$ of all reference patterns R as follows:

$$\sum_{x', y'} D_S(x', y') \cdot D_{R_n}(x', y')$$

If this operation is normalized with respect to the reference patterns, the reference pattern "$n$" that produces the largest comparison sum determines the identification of the specimen. Each comparison is normalized by dividing the square root of the sum of the squares of the elements of the autocorrelation function of the appropriate reference. A Schwartz inequality, as found on page 417 of a text authored by Wilfred Kaplan, entitled Advanced Calculus, 1952, published by the Addison-Wesley Publishing Company may be used to show that:

$$\sum_{x', y'} \frac{D_S(x', y') \cdot D_{R_n}(x', y')}{\left[\sum_{x', y'} D_{R_n}^2(x', y')\right]^{1/2}}$$

is a maximum when $D_S(x', y') = D_{Rn}(x', y')$.

Some functions of the autocorrelation function have been found to provide better specimen identification than is achieved by using the autocorrelation function itself, either by improving the distinction between patterns having certain similarities, or by "smoothing" small differences between essentially-similar patterns, such as "1" with and without a serif. One of the "discriminating" functions which improves distinction, the normalized "second-difference" function of the autocorrelation function is explained in detail below. Specimen identification using the autocorrelation function and the "second-difference" function of the autocorrelation function of the reference patterns are shown with respect to the electronic embodiment and the advantage of the latter is shown. The "second-difference" function is only one of many "discriminating" functions of the autocorrelation function that provide improved specimen identification.

One of the "smoothing" functions which overrides small differences, the normalized "averaging" functions of the autocorrelation function is also explained in detail.

Specimen identification may be further enhanced by using higher-order autocorrelation function comparison based on point triples, quadruples, etc. Higher-order autocorrelation functions techniques are described in detail in the previously-cited application Serial Number 118,124.

Autocorrelation function techniques and their use in the invention will be described in greater detail with respect to the drawings.

In the drawings:

FIGURE 1 is a block diagram of a preferred embodiment of the invention.

FIGURES 2 through 9 are diagrams showing the basic digital symbols used in FIGURES 10 through 20, 34 and 35.

FIGURES 10 through 20 are schematic diagrams showing the basic digital circuits used in FIGURES 34 and 35.

FIGURES 21 through 28 are a set of explanatory diagrams showing a procedure for generating the autocorrelation function of a typical pattern.

FIGURE 29 is a chart showing the autocorrelation function generated following the procedure in FIGURES 21 through 28.

FIGURE 31 is a chart showing the stability of identification of ten arabic numerals using autocorrelation function comparison.

FIGURE 32 is a chart showing the stability of identification of ten arabic numerals using "second-difference" autocorrelation comparison.

FIGURE 33 is a group of diagrams showing the stability of autocorrelation function specimen identification for typical specimens containing addition and deletion noise.

FIGURES 36 through 43 are diagrams showing the operation of the shift registers shown in FIGURE 35b.

FIGURE 44 is a diagram showing the autocorrelation function generated as a result of the operation of the shift registers in the diagram in FIGURE 35b.

Figure 1:
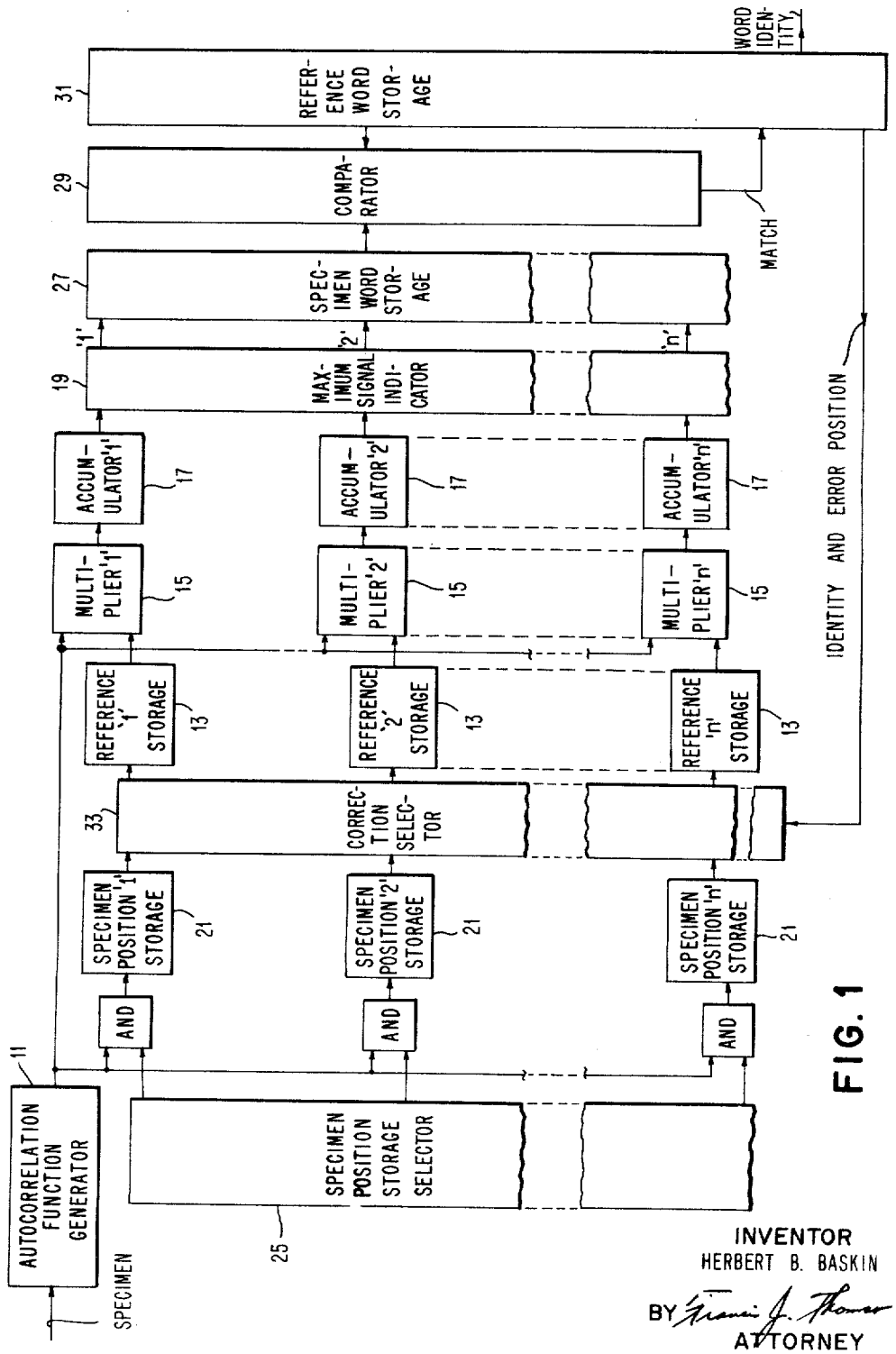

The invention is illustrated in the block diagram in FIGURE 1 where the input specimen to be identified is applied to an autocorrelation function generator 11. The generated function of the specimen is then compared with similar functions of reference patterns which are stored in reference storage circuits 13. The comparisons are accomplished by serially multiplying the specimen autocorrelation function elements and the reference pattern correlation function elements in multipliers 15 and summing these products in accumulators 17. The largest accumulator sum (after normalization, which is not shown in FIGURE 1) is indicative of the identity of the specimen and this indication is generated by a maximum signal indicator 19. The autocorrelation function of the specimen is also applied to one of a group of storage circuits 21 under the control of a group of "and" gates 23 which are, in turn, conditioned by a specimen position storage selector 25. Thus, the autocorrelation function of each specimen in the word is stored for subsequent use if an identified word contains an incorrectly-identified or rejected specimen.

The identities of a sequence of specimens that constitute a word are collected in a specimen word storage circuit 27. The specimen word is applied to a comparator 29 where it is analyzed with respect to reference words supplied from a reference word storage circuit 31. When a "match" is indicated by the comparator, an indication of the identity of the specimen word is generated by the reference word storage circuit. If the identified word contains an incorrectly-identified or rejected specimen, the reference word storage circuit supplies signals indicative of the necessary correction and the position of the error in the word. These signals are applied to a correction selector circuit 33 where they are used to control the reference storage circuit 13 whose data is to be altered and the specimen storage circuit 21 whose data is to be used for the alteration. For example, if the signals from the reference word storage circuit 31 indicate that the character in the second position of the word was incorrectly-identified as a "3" instead of a "4," the correction selector circuit 33 would cause the data stored in the specimen position 2 storage circuit to alter the data in the reference "4" storage circuit. In this manner, the reference storage data is continuously altered as specimen words are identified if the reference storage data does not cause each specimen to be correctly identified. In the embodiment to be described in detail below, the alteration consists of a replacement of all of the data in a reference storage circuit 13 by all of the data in a specimen storage circuit 21.

If, in a particular application of the invention, it is found desirable to gradually alter reference storage, a fraction of the difference between the reference storage data and the specimen storage data could obviously be combined with the reference storage data as the alteration. Similarly, the alteration could obviously be a function of the probability of successful identification and a function of the document quality. These types of alterations are shown and described in the previously-cited patent application by Maxwell C. Andrews.

The schematic diagrams include several symbols for circuits (such as flip-flops, "and" gates, etc.) and the functional blocks (such as registers, multipliers, etc.) which are explained in detail with respect to FIGURES 2 through 18.

FIGURES 2 through 9 show the basic digital symbols used in the schematic diagrams. These are binary conditions labelled "1" and "0," where "1" indicates the presence of a signal and "0" indicates the lack of a signal. R. K. Richards, Digital Computer Components and Circuits, 1957, published by Van Nostrand, provides a basic introduction to digital circuits and schematic diagrams of circuits that could be used in this invention.

Figure 2:
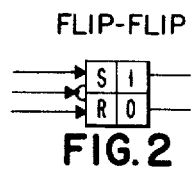

FIGURE 2 shows a basic bistable circuit, which is referred to as a flip-flop. The flip-flop is set by applying a "1" signal to the set (S) input. This provides a "1" signal at its "1" output and a "0" signal at its "0" output. This circuit is reset by applying a "1" signal to the reset (R) input, thus providing a "0" signal at the "1" output and a "1" signal at the "0" output. There is no effect on the circuit if an "S" input is applied when a circuit is already set, or if an "R" input is applied when previously reset. The third input is called a "complement" input and operates to reverse the condition of the circuit when a "1" signal is applied. If the circuit were set before the application of a complement signal, it would be reset by the signal. Similarly, if the circuit were reset before the application of this signal, it would be set by the signal.

Figure 3:
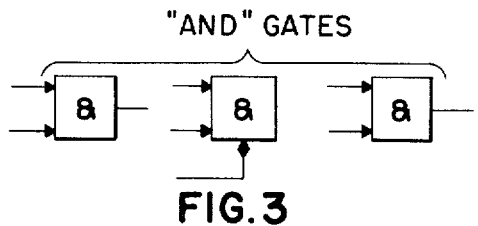
Figure 4:
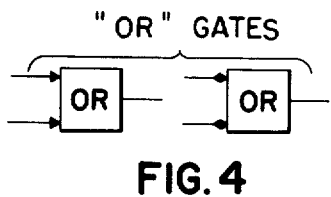

An "and" gate, as shown in FIGURE 3, provides a "1" output if all inputs received "1" signals at the same time. Three types of "and" gates are shown. An "or" gate, as shown in the two symbols in FIGURE 4, provides a "1" output if any "1" input is present. In all other cases, both the "and" gate and the "or" gate provides a "0" output.

Figure 5:
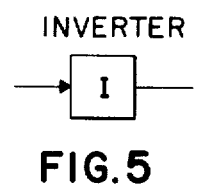

An inverter, as shown in FIGURE 5, reverses the input. If a "1" is applied, a "0" is developed as an output; if a "0" is applied, a "1" is developed.

Figure 6:
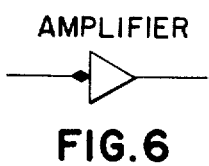

FIGURE 6 shows a symbol for conventional amplifier.

Figure 7:
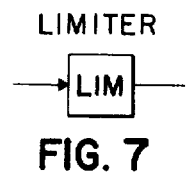

FIGURE 7 shows the symbols for a limiter. This circuit is shown in greater detail and described in conjunction with the schematic diagram in FIGURE 20.

Figure 8:
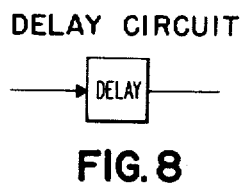

A delay circuit is shown in FIGURE 8. Signals applied to this circuit are passed after a period of time without being affected in shape or amplitude.

Figure 9:
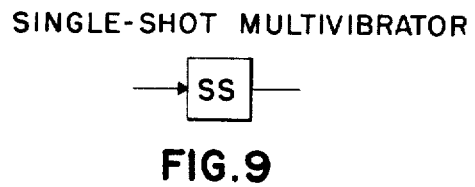

FIGURE 9 shows the symbol for a single-shot multivibrator. This circuit generates a rectangular gate output when a "1" signal is applied at its input. The output gate has an amplitude and polarity of a "1" signal and a duration dependent upon the circuit constants. Various digital circuits are shown in FIGURES 10 through 20 that are used in FIGURES 34 and 35. The input leads to the digital circuits are terminated in either an arrow or a diamond. An arrow indicates that either a pulse or the leading edge of a gate signal is required. A diamond indicates that a gate signal is required—for example, when used on connection with "and" gate, the diamond indicates the input to be a conditioning gate signal.

Figure 10:
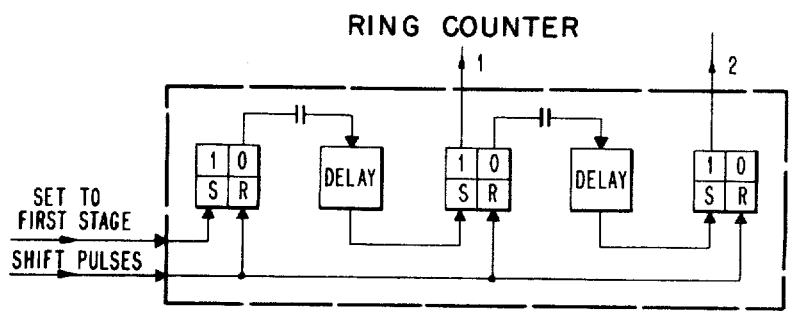
Figure 11:
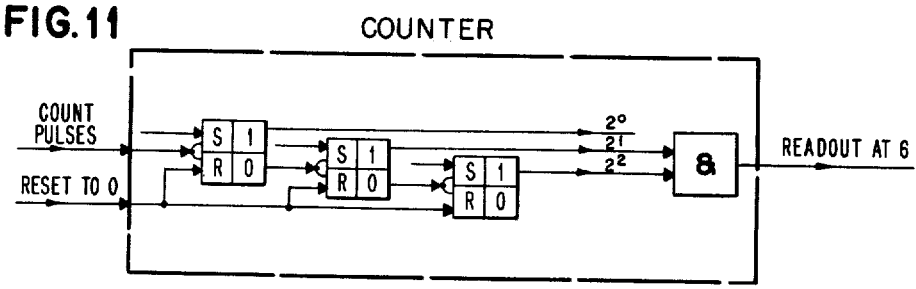

A ring counter is shown in FIGURE 10. Only one flip-flop of this counter is set at any time. At each application of a shift-pulse, the flip-flop previously set is reset and, after a delay, the adjacent higher-order, flip-flop is set. An additional input is provided to set the lowest-order flip-flop before the application of shift pulses. A more detailed description of the operation of a ring counter is found in a book authored by R. K. Richards entitled Arithmetic Operations in Digital Computers, 1955, published by Van Nostrand, Library of Congress Classification QA 76.R5, on pages 205–208. FIGURE 11 shows a series of flip-flop circuits that are connected to form a counter. Count pulses are serially applied to the complement input of the lowest-order flip-flop. The counter may be reset to 0 by the application of "1" signals to all "R" inputs, providing a "0" signal at each flip-flop "1" output. The first count pulse applied to the complement input sets the lowest-order flip-flop, providing a "1" at its output. Since the "0" output of this flip-flop is transferred from a "1" signal to a "0" signal, there is no effect on the adjacent flip-flop. The second applied count pulse resets the lowest-order flip-flop, providing a "0" signal at its "1" output lead and a "1" signal to the complement input of the adjacent flip-flop, transferring its condition. At this time, the $2^0$ and the $2^2$ output leads contain "0" signals and the $2^1$ output lead contains a "1" signal, indicating a total count 010, which is the binary representation of the decimal digit 2. As successive count pulses are applied, the output total increases until a total of 111 is obtained (after the 7th input pulse). The next (8th) count pulse applied causes an output total of 000 and succeeding pulses cause a repetition of the preceding operation. The counter need not be originally set to 000, but may be reset to any other number by applying "1" signals to the appropriate "S" and "R" inputs. When it is desired to provide a counter read-out signal for a particular count, an "and" gate is connected to the appropriate flip-flop outputs, depending upon the read-out count desired. In FIGURE 11, a read-out of 6 is indicated; thus the $2^1$ and $2^2$ inputs are applied to the "and" gate. This causes an output signal to be generated when the counter stores a count of either 6 of 7, as in those two cases the $2^1$ and $2^2$ leads contain "1" signals. When it is desired that the counter read out at 6 only, the $2^0$ signal is inverted and applied to the "and" gate. In this case the "and" gate has "1" signals applied to it at a counter of 6 only because the $2^0$ signal is a "0" at this time, which after inversion provides the required "1" signal to operate the "and" gate. This could be accomplished without the use of an inverter if the third input to the "and" gate were taken from the "0" output of the lowest-order flip-flop.

Figure 12:
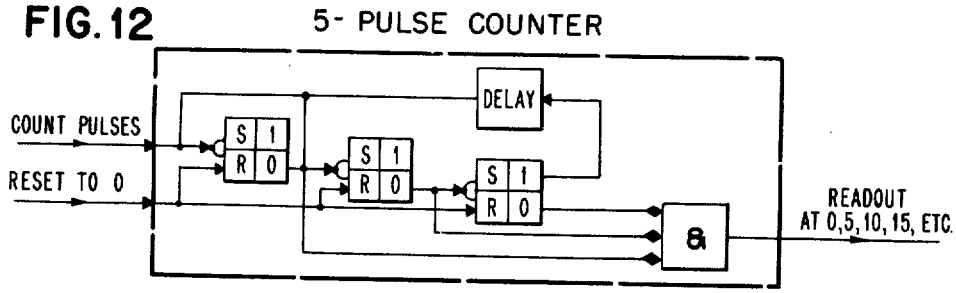

Referring next to FIGURE 12, there is shown a 5-pulse counter which provides an output for every fifth input count pulse. The "and" gate in this counter has signals applied to it from the "0" outputs of each of the flip-flops, thus the "and" gate provides an output signal when all flip-flops are reset. A reset to "0" signal is applied to the counter to reset all flip-flops. As count pulses are applied, the counter operates in a manner similar to the counter of FIGURE 11, except that, at a count of 4, a signal is delayed and fed back to the complement input of the 2-lower-order flip-flops. Thus, the fourth count pulse which initially resets the two lower-order flip-flops and sets the highest-order flip-flop, causes a signal to fed back to the two lower-order flip-flops, setting them. The fifth count pulse applied to the circuit of FIGURE 12 causes all flip-flops to be reset which provides an output from the "and" gate. In a similar manner, the tenth, fifteenth, etc. pulses applied to this counter cause outputs from the "and" gate.

Figure 13:
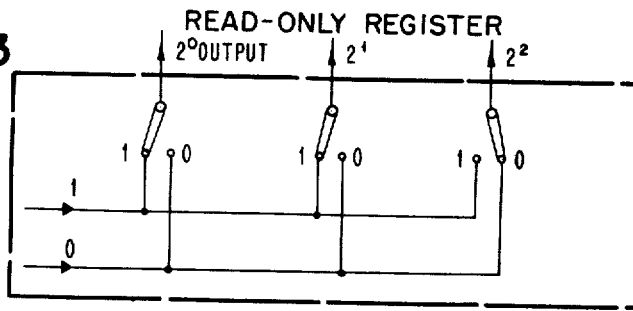

In FIGURE 13 there is shown a read-only register which provides "1" outputs on various leads dependent upon the setting of switches. The register (as shown) stores the binary number 011.

Figure 14:
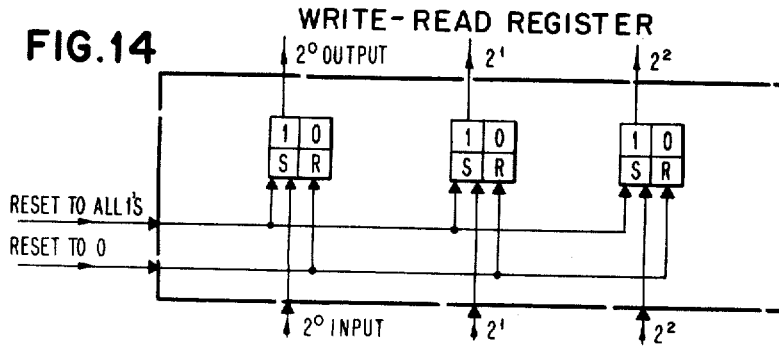

FIGURE 14 shows a write-read register. This register is reset to "0" by the application of a pulse to the flip-flop reset inputs; reset to all "1's" by the application of a pulse to all flip-flop set inputs; or reset to any other number by the application of pulses to the appropriate set and reset inputs of the flip-flops. A number is written into the register by the parallel application of pulses on the appropriate signal input leads. For example, if it were desired to write the number 101 into the register, the register would be previously reset to "0," and then a "1" signal would be applied on the $2^2$ and $2^0$ inputs. A "0" signal would be applied on the $2^1$ input. The register output, taken from the "1" outputs of the flip-flops, indicates the binary number stored in the register.

A recycling shift register is shown in FIGURE 15. This register is comprised of a group of shift register "sections" in tandem. The previously-cited R. K. Richard's text entitled Arithmetic Operations in Digital Computers contains an explanation of these and other shift register sections on pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest-order flip-flop. Since this is a recycling shift register, the output of the highest output order flip-flop is fed back to the lowest-order flip-flop. In this manner, the data that is placed in the shift register is recycled by the application of subsequent shift pulses. A high-order read-out is provided to indicate the highest-order bit in the register. In this manner, data stored in the register can be read out serially merely by applying a succession of shift pulses.

An accumulator is shown in FIGURE 16. This accumulator is of the type shown on FIGURE 4-22 (page 110) and described in the perviously-cited R. K. Richard's text entitled Arithmetic Operation in Digital Computers. A reset input is applied to each flip-flop in the accumulator. The binary word (parallel) to be accumulated and an "add" pulse are applied simultaneously and the binary word is added to the previously stored sum. This circuit is explained in detail in the reference.

The subtracter shown on FIGURE 17 is similar to the subtracter shown and described in the previously-cited R. K. Richard's text entitled Arithmetic Operation in Digital Computers. The half-subtracters shown on FIGURE 17 follow the binary subtraction Table 4–III, on page 115 of the reference. The half-adder shown on FIGURE 17 is identical to the circuit in the reference in Figure 4–3(c) on page 86. FIGURE 17 shows only two stages of the subtracter in detail. The third stage is shown as a block which is presumed to include all the circuits in the second stage. Since the binary subtracter output indication for negative differences is in the complement form, the borrow from the highest-order full subtracter indicates the sign of the difference—a "1" indicates a negative difference, a "0" indicates a positive difference.

FIGURE 18 shows an add-"1" register. This register may be reset to 0 by the application of a pulse to the reset input of each flip-flop. A number to be stored in the register is applied in parallel to the set inputs of the flip-flops in a manner similar to the write-read register in FIG. 14. The add "1" register increases its total by "1" when a signal is applied on the add "1" input. In this respect, the add-1 register operates in a manner similar to the counter in FIGURE 11, as the "0" output of each flip-flop is applied as the "complement" input of the adjacent flip-flop.

FIGURE 19 shows an "inverted exclusive or" circuit. An "exclusive-or" circuit is defined as one which provides a "1" output when either of two input signals are "1" and a "0" output when both inputs are "1" or both are "0." An "inverted exclusive-or" produces an opposite effect—when both inputs are "1" or both are "0," a "1" is generated; and when one input is "1" and the other is "0," a "0" is generated. Using Boolean algebra, the "inverted exclusive-or" function is defined as $\overline{AB} + \overline{A}B$ for inputs "A" and "B." In FIGURE 19, when both inputs are "1," the "and" gate generates a "1" signal which is passed by the output "or" gate. When both inputs are "0," a "0" signal is changed to a "1" signal by the inverter which is then passed by the output "or" gate. When one input is a "1" and one is a "0," the output "or" gate generates a "0" signal.

A non-cycling shift register is shown in FIGURE 20. This circuit differs from the recycling shift register shown in FIGURE 15 in that the feed-back connections from the high-order "and" gates to the low-order flip-flop are deleted. For this reason, the data in the high-order of the non-cycling shift register is discarded rather than returned to the low-order input after each shift pulse. The non-cycling shift register has circuit output connections from each order, where the recycling shift register has an output from the high-order only, but this difference does not affect the operation of the circuit.

A multiplier that is suitable to be used in the invention is shown in Figure 5-1 (page 139) and explained in the previously-cited R. K. Richard's text entitled Arithmetic Operation in Digital Computers.

A divider and a square rooter that are suitable for use in the invention are shown and described in patent application Serial Number 159,175 filed 12/13/61 by H. Fleisher and R. I. Roth, entitled Computing Techniques, and patent application Serial Number 159,034 filed 12/13/61 by R. I. Roth and H. Fleisher entitled Computing Techniques.

In order to provide a clear illustration of the principles of the invention which are embodied in the accompanying detailed descriptions, the manual generation of autocorrelation functions and some of the theory associated therewith will be described below.

The autocorrelation function is a measure of the correlation of a function with itself and is generated by comparing the specimen to be autocorrelated with itself, shifted in all directions and distances.

FIGURES 21 through 28 illustrate a method of generating the autocorrelation function in FIGURE 29 for a typical pattern "3." In the following description, the patterns are comprised of 15 discrete areas on a 3 x 5 matrix for simplicity of arithmetic. In practice, this invention is designed to be used to identify specimens comprising many discrete areas on a large martix.

The pattern "3" formed by slant-left lines is common to FIGURES 21 through 28; the pattern formed by slant-right lines is shifted to various positions in the figures.

FIGURE 21 illustrates the "0-shift" pattern, and hence, the slant-left and slant-right patterns are superimposed. If the discrete areas of the matrix are considered to have $x$ and $y$ coordinates, as shown in FIGURE 21 $f(x, y)$ is "1" for $(x=3, y=9)$; $(x=4, y=9)$; $(x=5, y=8)$; $(x=4, y=7)$; $(x=5, y=6)$; $(x=4, y=5)$; and $$(x=3, y=5)$$

For all other values of $x$ and $y$, $f(x, y) = 0$. The autocorrelation function $D(x', y')$ is determined by the equation:

$$D(x', y') = \sum_{x, y} f(x, y) f(x+x', y+y')$$

In the "0-shift" condition (FIGURE 21), $x' = y' = 0$ and the sum is merely a count of the number of areas that are filled by the pattern, as the product $$f(x, y) \cdot f(x+0, y+0) = 1$$

whenever $f(x, y) = 1$. This sum is "7" for the pattern in FIGURE 21, and it is placed in the "0" shift position 151 in the table in FIGURE 29. FIGURE 22 illustrates the conditions present for a shift of one unit to the right (designated as $x'=1$, $y'=0$), which causes a "2" to be placed at the corresponding position 153 of the table in FIGURE 29 as there are two coincident areas on the martix. Position 153 is displaced one unit to the right of position 151 to correspond to a shift of one unit to the right of the pattern in FIGURE 22. A "2" is also placed in position 155 of the table as a shift to the left of one unit ($x'=1$, $y'=0$) obviously produces the same result as a shift to the right of one unit ($x'=1$, $y'=0$). FIGURE 23 illustrates the conditions present for ($x'=2$, $y'=0$) which provides a "0" at location 157 on FIGURE 29 (and also position 159), corresponding to $$(x'=-2, y'=0)$$

In a similar manner, positions 161 and 163 of the table are filled with "1's" as determined by FIGURE 24. FIG- URES 25 through 28 illustrate the conditions present for several other combinations of $x'$ and $y'$. Using this procedure, the entire autocorrelations table of FIGURE 29 may be filled in for the typical pattern "3."

Figure 30A:
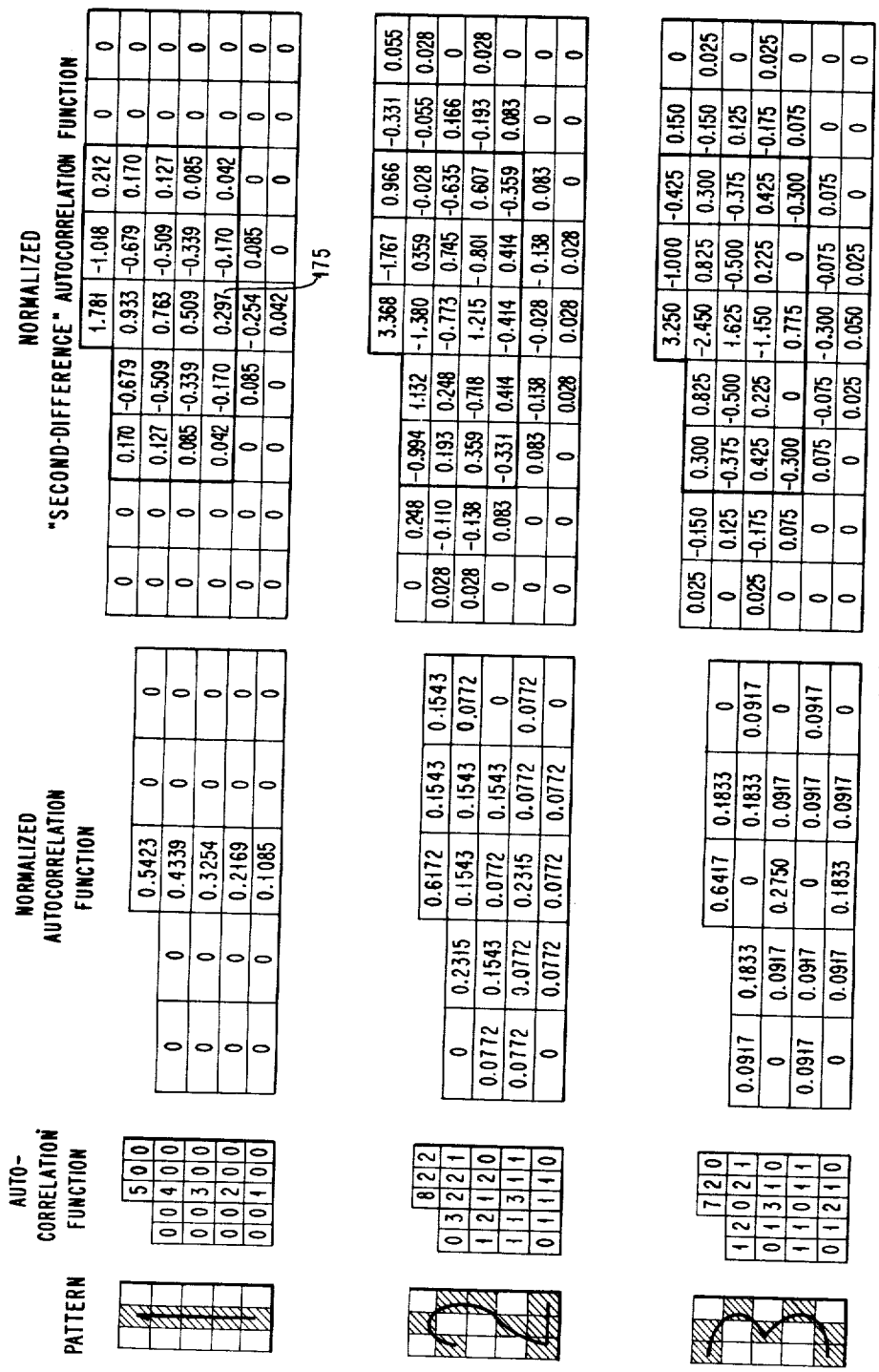
FIGURE 30 is a chart showing the autocorrelation functions, normalized autocorrelation functions and normalized "second-difference" functions for ten arabic numerals.
Figure 30B:
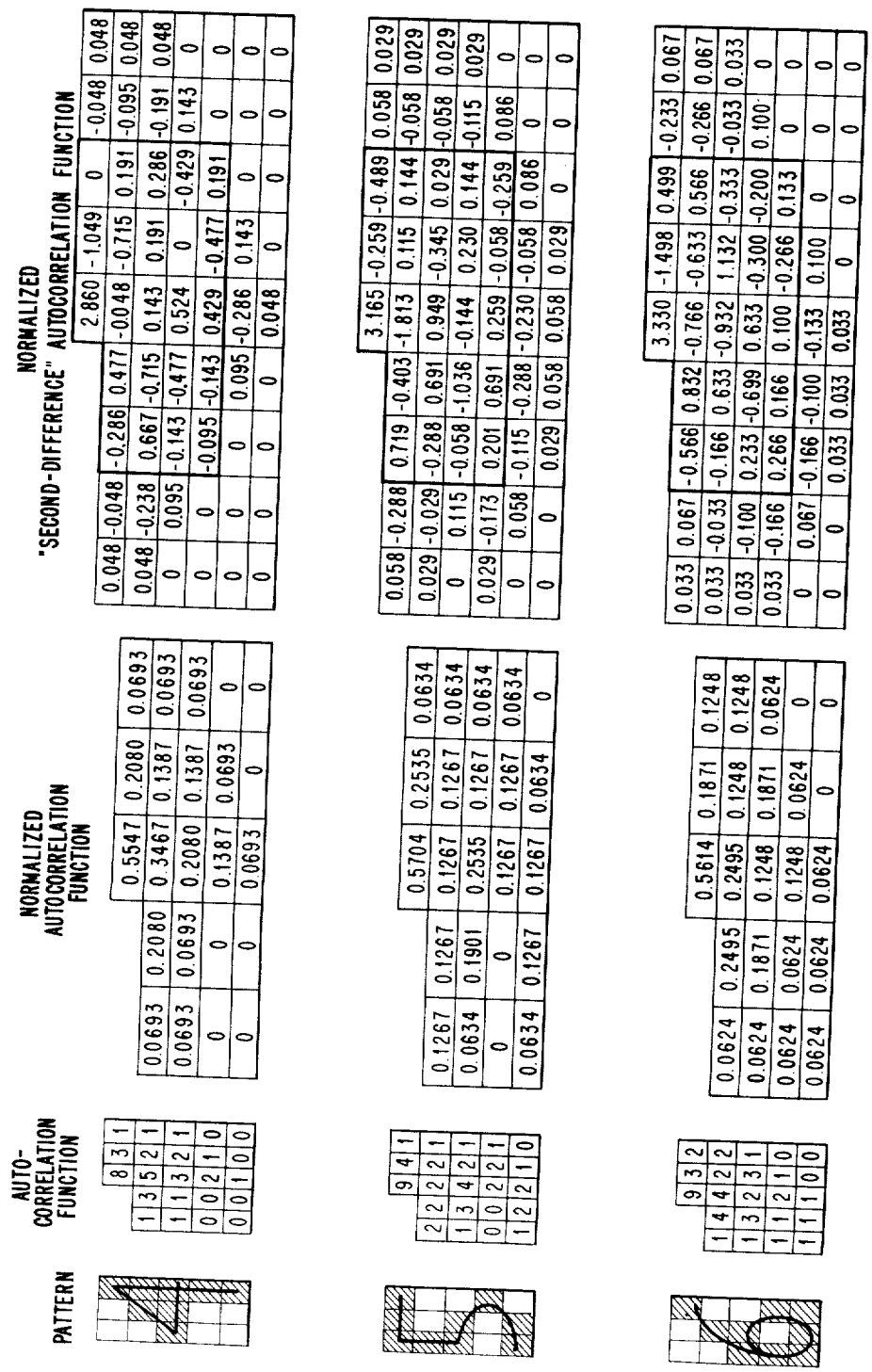
Figure 30C:
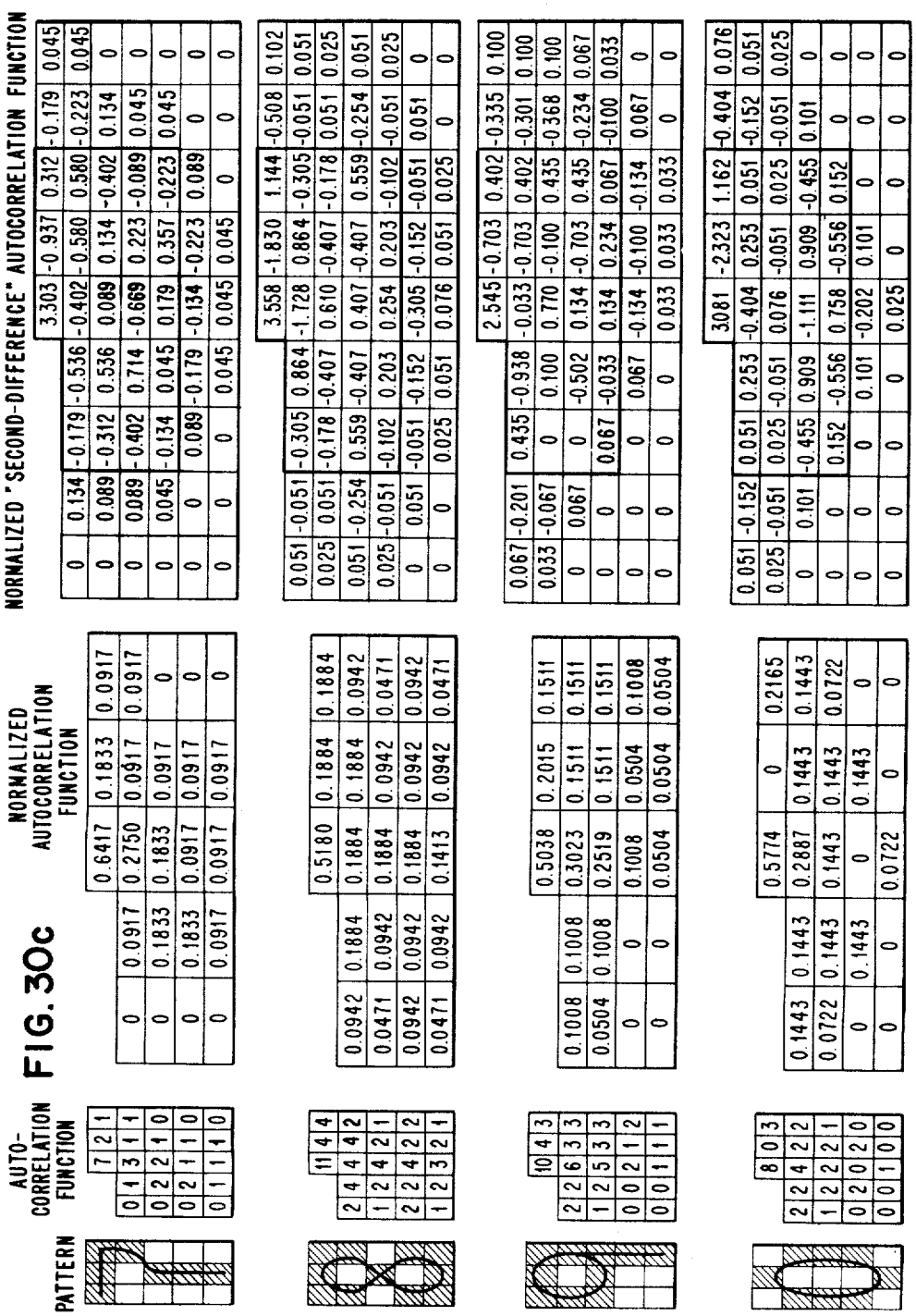

FIGURE 30 shows ten arabic numeral patterns on 3 x 5 matrices and their autocorrelation functions. In addition, normalized autocorrelation functions and normalized "second-difference" autocorrelation functions are shown. All functions are shown in abbreviated form, omitting the redundant "reflected" portions. The generation of the autocorrelation function has been described above and this function forms the basis for comparison in the embodiment to be described in detail subsequently. Since the system is normalized with respect to the input specimen, the normalized autocorrelation functions are also shown and described for each reference pattern (and, hence, for each perfect specimen).

The normalized autocorrelation function of the reference "$R_n$" is generated according to:

$$\frac{D_{R_n}(x', y')}{\left[\sum_{x', y'} D_{R_n}^2(x', y')\right]^{1/2}}$$

A calculation for the pattern "1" provides a divisor of $$(1^2+2^2+3^2+4^2+5^2+4^2+3^2+2^2+1^2)^{1/2}=85^{1/2}=9.22$$

which is divided into 1, 2, 3, 4 and 5 to obtain 0.1085, 0.2169, 0.3254, 0.4339 and 0.5423, respectively. The division must be computed using the redundant numbers that are not shown on FIGURE 30 as well as the numbers shown. Although the invention is embodied in a system using basic autocorrelation function comparison, it is considered to be obvious to extend the system to include comparison based on other functions. Such functions include "discriminating" functions which emphasize small specimen differences, such as that encountered between a "O" and a "Q", and "smoothing" functions which ignore these differences and are useful in overcoming the effects of serifs, noise, etc.

One of the "discriminating" functions, the normalized "second-difference" function is obtained according to:

$$\frac{E_{R_n}(x', y')}{\left[\sum_{x'', y''} F_{R_n}^2(x, y)\right]^{1/2}}$$

where $$E_{R_n}(x'', y'') = \sum_{x', y'} L_{x'', y''}(x', y') \cdot D_{R_n}(x', y')$$

$$F_{R_n}(x'', y'') = \sum_{x', y'} M_{x'', y''}(x', y') \cdot D_{R_n}(x', y')$$

and, in turn, where:

$$L_{0,0}(x', y') = \begin{matrix} 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 2 & -8 & 2 & 0 & 0 & 0 & 0 & 0 \\ 0 & 0 & 0 & 1 & -8 & 20 & -8 & 1 & 0 & 0 & 0 & 0 \\ 0 & 0 & 0 & 0 & 2 & -8 & 2 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \end{matrix}$$

$$M_{0,0}(x', y') = \begin{matrix} 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & -1 & 0 & 0 & 0 & 0 & 0 & 0 \\ 0 & 0 & 0 & 0 & -1 & 4 & -1 & 0 & 0 & 0 & 0 & 0 \\ 0 & 0 & 0 & 0 & 0 & -1 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \end{matrix}$$

The subscripts for L and M indicate the position on the 13 x 17 matrix that the non-zero portion fills. For example, subscripts (0, 0) indicate the non-zero portion of the matrix is centered as shown above whereas subscripts (2, −3) would indicate that all non-zero elements are shifted up two positions and to the left three positions. The L matrix is the autocorrelation function of the M matrix.

A sample calculation to obtain the 0.297 at position 175 of the normalized "second-difference" autocorrelation function for the pattern "1" follows. The autocorrelation function is centered on a 13 x 17 matrix as follows:

$$D_{R1}(x', y') = \begin{matrix} 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 2 & 0 & 0 & 0 & 0 & 0 & 0 \\ 0 & 0 & 0 & 0 & 0 & 3 & 0 & 0 & 0 & 0 & 0 & 0 \\ 0 & 0 & 0 & 0 & 0 & 4 & 0 & 0 & 0 & 0 & 0 & 0 \\ 0 & 0 & 0 & 0 & 0 & 5 & 0 & 0 & 0 & 0 & 0 & 0 \\ 0 & 0 & 0 & 0 & 0 & 4 & 0 & 0 & 0 & 0 & 0 & 0 \\ 0 & 0 & 0 & 0 & 0 & 3 & 0 & 0 & 0 & 0 & 0 & 0 \\ 0 & 0 & 0 & 0 & 0 & 2 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \end{matrix}$$

The denominator $$\left[\sum_{x'', y''} F_{R_1}^2(x'', y'')\right]^{1/2}$$

is determined as follows:

$F_{R1}(0, 0)$ equals $(4)(5)+(-1)(4)+(-1)(4)=12$

All products other than $$D_{R1}(0, 0) \cdot L_{0, 0}(0, 0), D_{R1}(0, 1) \cdot L_{0,0}(0, 1)$$

and $$D_{R1}(0, -1) \cdot L_{0, 0}(0, -1) \text{ equal } 0$$

Similarly, $F_{R1}(0, 1)=F_{R1}(0, -1)=(4)(4)+$
$\qquad (-1)(3)+(-1)(5)=8$ $F_{R1}(0, 2)=F_{R1}(0, -2)=(4)(3)+$
$\qquad (-1)(2)+(-1)(4)=6$ $F_{R1}(0, 3)=F_{R1}(0, -3)=4(2)+$
$\qquad (-1)(1)+(-1)(3)=4$ $F_{R1}(0, 4)=F_{R1}(0, -4)=4(1)-1(2)=2$ $F_{R1}(0, 5)=F_{R1}(0, -5)=-1(1)=-1$ $F_{R1}(1, 0)=F_{R1}(-1, 0)=(-1)(5)=-5$ $F_{R1}(1, 2)=F_{R1}(1, -2)=F_{R1}(-1, 2)$
$\qquad =F_{R1}(-1, -2)=(-1)(3)=-3$ $F_{R1}(1, 3)=F_{R1}(1, -3)=F_{R1}(-1, 3)$
$\qquad =F_{R1}(-1, -3)=(-1)(2)=-2$ $F_{R1}(1, 4)=F_{R1}(1, -4)=F_{R1}(-1, 4)$
$\qquad =F_{R1}(-1, -4)=(-1)(1)=-1$ The denominator is finally determined as:

$$[12^2+2(8)^2+2(6)^2+2(3)^2+2(2)^2$$
$$+2(-1)^2+2(-5)^2+4(-4)^2+4(-3)^2$$
$$+4(-2)^2+4(-1)^2]^{1/2}=556^{1/2}=23.58$$

Each numerator $E_{R1}(x'', y'')$, is obtained by multiplying $L_{x'', y''}(x', y')$ by $D_{R1}(x', y')$, point-by-point, and summing over $x', y'$. In order to obtain the number at position 175, which corresponds to $(x'=0, y'=4)$, the matrix $L_{0, 4}(x', y')$ is multiplied point-by-point by $D_{R1}(x', y')$ and summed. This results in $$(20 \times 1)+(-8 \times 2)+(1 \times 3)=7$$

The remaining products are zero.

The resulting number for position 175 of the normalized "second-difference" autocorrelation function is thus:

$$\frac{7}{23.58}=0.297$$

Since the L matrix is a basic 5 x 5 matrix surrounded by zeros and the autocorrelation function matrix is a basic 5 x 9 matrix surrounded by zeros, the normalized "second-difference" autocorrelation function matrix is a basic 9 x 13 matrix surrounded by zeros. The redundant "reflected" portions of the matrix are not shown in FIGURE 30. When normalized "second-difference" autocorrelation functions are used in the specimen identification apparatus, comparison sums $S_{S, R_n}$ are developed by the formula:

$$S_{S, R_n} = \frac{\sum_{x', y'} D_S(x', y') \cdot E_{R_n}(x', y')}{\left[\sum_{x'', y''} F_{R_n}^2(x'', y'')\right]^{1/2}}$$

Since $D_S(x', y')$ is zero for $x' > \pm 2$ or $y' > \pm 4$, all products (numerators) are zero in these cases. For this reason, only the portions of the normalized "second-difference" autocorrelation functions within the heavy lines (FIGURES 28–30) are necessary.

The use of "second-difference" functions improves discrimination due to the negative components in the M matrix. Another class of functions, the "smoothing" functions, does not improve discrimination, but improves stability of recognition of poor specimens, such as those with addition or deletions noise, those with or without serifs, etc. These functions are determined by the preceding formulas for the "second-difference" functions, replacing the M matrix with a matrix (S) having no negative elements and replacing the L matrix with a matrix (R) derived as the autocorrelation function of the S matrix. One of the "smoothing" functions, the "averaging" function, uses the following S matrix:

$$S_{0,0}(x', y') = \begin{matrix}
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 & 0 \\
0 & 0 & 0 & 0 & 1 & 1 & 1 & 0 & 0 & 0 & 0 & 0 & 0 \\
0 & 0 & 0 & 0 & 0 & 1 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
\end{matrix}$$

The autocorrelation function of the S matrix provides the following R matrix:

$$R_{0,0}(x', y') = \begin{matrix}
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
0 & 0 & 0 & 0 & 0 & 1 & 0 & 0 & 0 & 0 & 0 \\
0 & 0 & 0 & 0 & 2 & 2 & 2 & 0 & 0 & 0 & 0 \\
0 & 0 & 0 & 1 & 2 & 5 & 2 & 1 & 0 & 0 & 0 \\
0 & 0 & 0 & 0 & 2 & 2 & 2 & 0 & 0 & 0 & 0 \\
0 & 0 & 0 & 0 & 0 & 1 & 0 & 0 & 0 & 0 & 0 \\
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
0 & 0 & 0 & 0 & 0 & 0 & 0 & 0 & 0 & 0 & 0 \\
\end{matrix}$$

The "averaging" function of the autocorrelation functions are obtained according to:

$$\frac{R_{R_n}(x', y')}{\left[\sum_{x'', y''} C_{R_n}^2(x'', y'')\right]^{1/2}}$$

where $$B_{R_n}(x'', y'') = \sum_{x', y'} R_{x'', y''}(x', y') \cdot D_{R_n}(x', y')$$

and $$C_{R_n}(x'', y'') = \sum_{x', y'} S_{x'', y''}(x', y') \cdot D_{R_n}(x', y')$$

The comparison sums $S_{S, R_n}$ are then developed by the formula:

$$S_{S, R_n} = \frac{\sum_{x', y'} D_S(x', y') \cdot B_{R_n}(x', y')}{\left[\sum_{x'', y''} C_{R_n}^2(x'', y'')\right]^{1/2}}$$

Autocorrelation function comparison provides accurate and stable identification of specimens. The sums $S_{S, R_n}$ obtained using the data of FIGURE 30 and discussed above are shown in FIGURE 31 where the normalized autocorrelation function of the reference patterns are used, and in FIGURE 32 where the normalized "second-difference" autocorrelation function reference patterns are used. The largest sums are developed in each case when the input pattern matches the reference pattern, but when "second-difference" autocorrelation comparison is used, a larger ratio is obtained between the closest and second-closest matches.

FIGURE 33 shows the results obtained when using autocorrelation function comparison of ideal input specimens and input specimens containing deletion and addition noise with reference patterns. In this case, the patterns are divided into a larger number of discrete areas than the patterns used in the preceding description. The preceding description is simplified in this manner. In practice, the invention is used with patterns having a number of discrete areas of the order shown in FIGURE 33. The data below the patterns is the measure of similarity of the specimen to three reference patterns (A, B and R) and was obtained by further normalizing the sums $S_S, R_n$ obtained using normalized autocorrelation function $Z_{R_n}(x', y')$ comparison. Patterns A, B and R, which are similar in structure, were chosen to show the stability of autocorrelation function comparison under adverse conditions.

Figures 34, 34A:
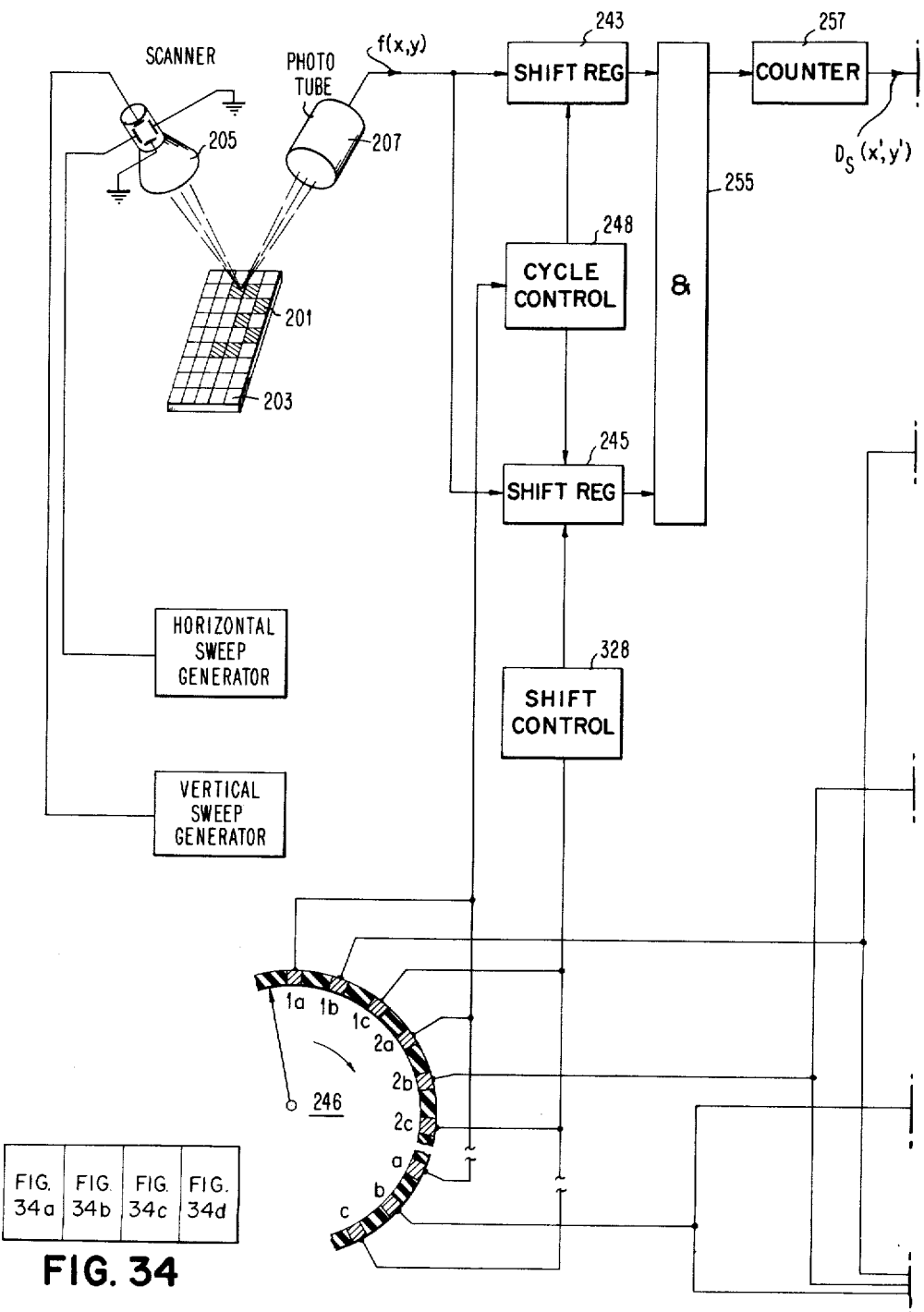
FIGURE 34 is a functional diagram of the embodiment of the invention shown in the block diagram of FIGURE 1.

A functional diagram of an electronic embodiment of the invention using digital circuits is shown in FIGURE 34. This diagram parallels the block diagram shown in FIGURE 1 but involves greater detail. A specimen 201 on a matrix 203 is scanned by a flying-spot scanner 205. A phototube 207 develops a signal $f(x, y)$ indicative of the specimen. Any means of converting the specimen to electrical information could be used. In this case, the scanner and phototube illustrate one means of obtaining an electronic indication of the specimen.

The phototube 207 output is stored in two recycling shift registers 243 and 245. A clock 246 controls the timing of the circuits. This clock makes one complete cycle during the scanning of each specimen in a word. At time "1a" a pulse is applied to the ycle control circuit 248 which supplies a series of cycling pulses to the shift registers 243 and 245 to sequentially shift the data in each register completely through the register and return the data to its original position. An "and" gate 255 and counter 257 develop the "zero-shift" autocorrelation function $D_S(0, 0)$, which is applied to a group of multipliers 303. At time "1b," a pulse is applied to appropriate "and" gates 313 to cause the autocorrelation function of the references R1, R2 ... Rn ... for $x'=0$, $y'=0$, designated $D_{R1}(0, 0)$; $D_{R2}(0, 0)$ ... $D_{Rn}(0, 0)$ ... to be applied to the appropriate multipliers 303 from registers 299. The products $D_S(0, 0) \cdot D_{R1}(0, 0)$;

$D_S(0, 0) \cdot D_{R2}(0, 0)$ ... $D_S(0, 0) \cdot D_{Rn}(0, 0)$ ...

are developed by the multipliers and applied to a group of accumulators 327. At time "1c," a pulse is applied to a shift control circuit 328, which causes the data in shift register 245 to be shifted one position. The shift registers are again recycled at time "2a" and the counter develops an output $D_S(1, 0)$ which at time "2b" is multiplied by $D_{R1}(1, 0)$; $D_{R2}(1, 0)$ ... $D_{Rn}(1, 0)$ ... to develop products $D_S(1, 0) \cdot D_{R1}(1, 0)$;

$D_S(1, 0) \cdot D_{R2}(1, 0)$ ... $D_S(1, 0) \cdot D_{Rn}(1, 0)$ ...

These products are applied to accumulators 327 where they added to the previously stored products. In a similar manner, the remaining products are developed and applied to the accumulators. After all products have been developed, the accumulator outputs represent $$\sum_{x', y'} D_S(x', y') \cdot D_R(x', y')$$

for each reference R. These signals are applied to a group of dividers 401 where they are divided by a normalization factor.

$$\left[ \sum_{x', y'} D_R^2(x', y') \right]^{1/2}$$

A maximum signal indicator 330 selects the largest divider output as an indication of the identity of the specimen or provides a "reject" indication if the ratio of the largest sum to the second largest sum is insufficient. Each maximum signal indicator output lead, including the "reject" lead, is applied as the input data to a shift register 403. A signal is only applied to the shift register that corresponds to the identity of the specimen. Subsequent to the identification of each specimen in a word, a shift pulse is generated by the maximum signal indicator 330. This signal causes the data in the registers 403 to be shifted one position (to the right). Thus, after an entire word has been scanned, the identity of the first specimen is indicated by data in the first (highest) order of a shift register, and the data in the "$m$th" position of the shift registers is indicative of the identity of the "$m$th" specimen.

Figure 34B:
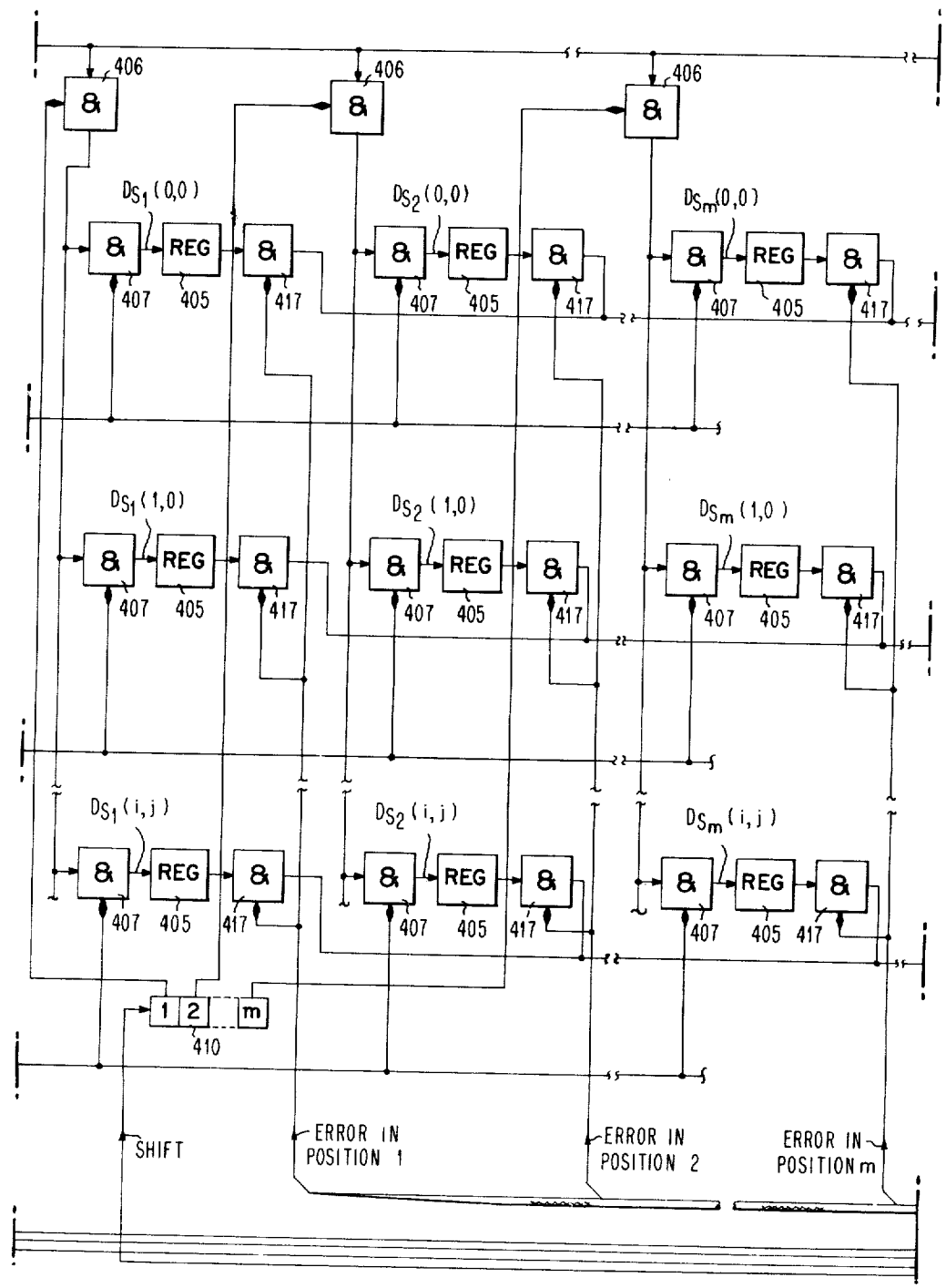
Figure 34D:
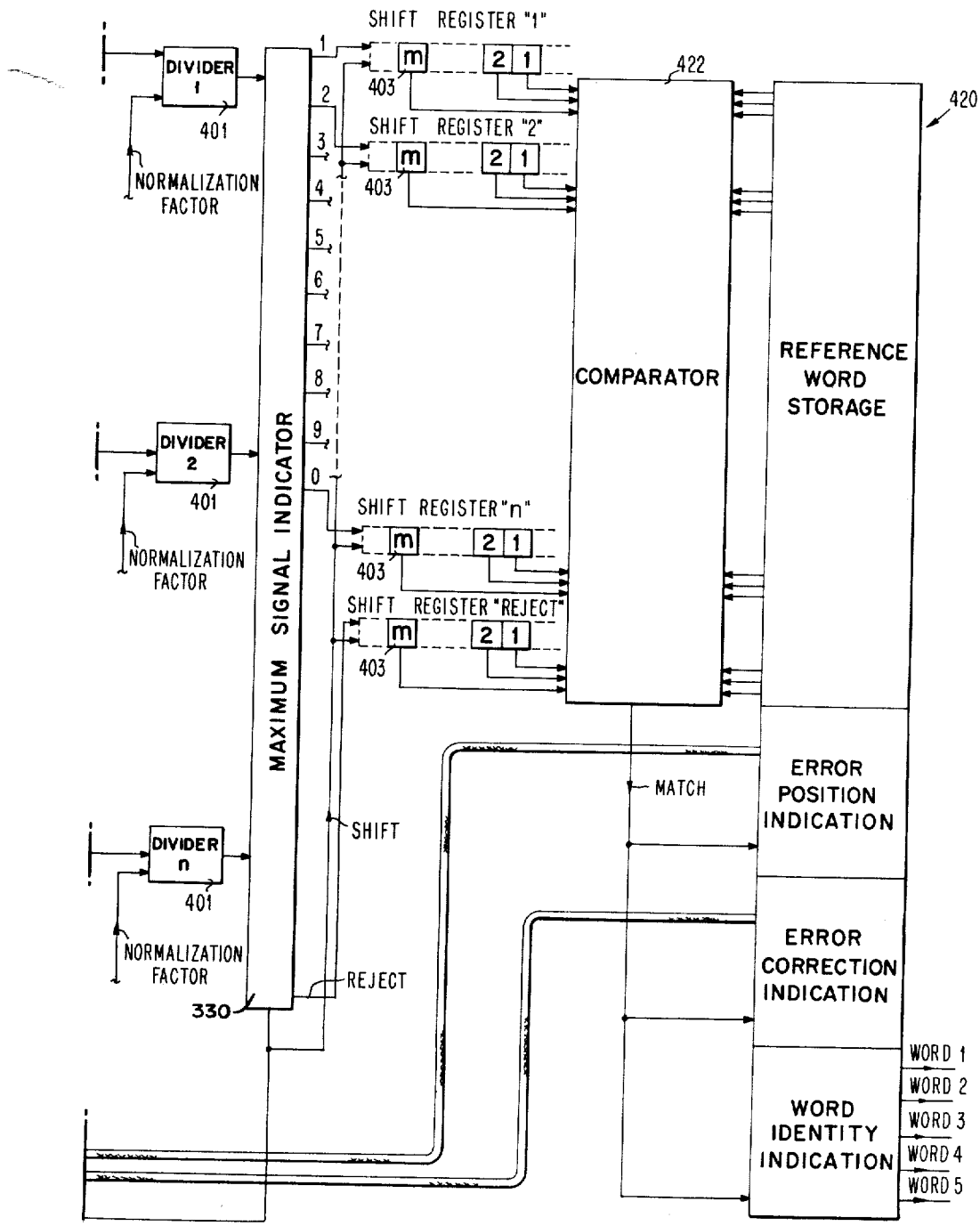

The elements of the autocorrelation functions of each scanned specimen are also applied to specimen storage registers 405 (FIGURE 34b), through position-selecting "and" gates 406 and element-selecting "and" gates 407. The shift pulses generated by the maximum signal indicator 339 (FIGURE 34d) are applied to a ring counter 410 (FIGURE 34b) which sequentially generates output signals to condition "and" gates 406. Thus, as the first specimen in a word is being scanned, the ring counter 410 provides a conditioning signal from its first order output to permit the elements of the autocorrelation function of the first specimen to be applied to the first column ($D_{S1}$) of registers 405. The element-selecting "and" gates 407 are controlled by the timer 246 to sequentially store each element of the autocorrelation function of the specimen in the appropriate register 405 in the column selected by the conditioned position-selecting "and" gate 406. Thus, the autocorrelation functions of the specimens in a word are stored for subsequent use if the word is identified but a specimen in the word is incorrectly identified or rejected.

A reference storage circuit 420 (FIGURE 34d) contains storage of: reference word sequences, the positions and identities of errors in words that are correctly identified but that contain incorrectly-identified or rejected specimens, and the identity of the specimen word. All of the allowable sequences of specimens that constitute a reference word, including sequences with incorrectly identified or rejected specimens, are stored in the reference storage circuit 420. These sequences are compared to the specimen sequence stored in shift registers 403 by a comparator 422. When a word is identified, a "match" signal is generated by the comparator. This signal activates the word identity indication portion of the reference storage circuit 420 which generates an indication of the identity of the word. The "match" signal is also applied to the error position and identity indication portions of the storage circuit 420. If a specimen is incorrectly-identified or rejected but the word is identified, these circuits supply signals to a group of position-responsive "and" gates 417 and identity-responsive "and" gates 418 to cause the data stored in the appropriate reference storage register 299 to be replaced by corrected data. Thus, if the system identified the "$m$th" specimen in a word as a "2" and it should have been identified as a "1," the data ($D_{R1}$) in the reference 1 storage register 299 is replaced by the data ($D_{S_m}$) in the "$m$th" position specimen storage register 405. In this manner, the system automatically adapts to changing specimen font or quality. The system may obviously be extended to correct multiple errors in a word and to make gradual alterations of reference pattern storage rather than a complete replacement of data.

FIGURE 35 is a schematic diagram of the invention that was described with respect to the block diagram in FIGURE 1 and the functional diagram in FIGURE 34. A specimen 201 on a matrix 203 is serially scanned by a flying-spot scanner 205 and a phototube 207. A book authored by V. K. Zworykin and E. G. Ramberg entitled Photoelectricity and Its Application, 1949, published by John Wiley, QC715.Z8 describes a flying-spot scanner and associated sweep circuits on pages 369–375.

The phototube output is presumed to be of sufficient amplitude to operate the subsequent circuitry. A photomultiplier or other suitable means of amplification is not shown as it is considered to be obvious to one skilled in the art to provide the necessary basic circuits to produce adequate signal levels. Similarly, no amplifiers are shown in any logic circuits, with the exception of circuit output drivers.

FIGURE 45 shows several waveshapes that pertain to the circuit shown in FIGURE 35. The waveshape labels correspond to similarly labelled points and leads on FIGURE 35. A specimen start pulse (waveshape A) initiates the operation of the pattern identification circuit. This signal is generated by the document transport mechanism when the specimen to be identified is properly positioned. This pulse causes a single shot gate generator 209 to produce a conditioning gate on lead 211 that is one unit wide. One unit of time is defined as being the time between adjacent clock pulses (waveshape B). The first clock pulse occurring after start pulse A is thus passed through "and" gate 213 as waveshape C. This pulse serves several functions, one of which is to trigger the vertical sweep generator 204 which generates the vertical sweep (waveshape D) for the flying-spot scanner 205. Since the matrix 203 is considered to have five discrete positions along each horizontal row, and nine discrete horizontal rows, the flying spot scanner sweeps horizontally nine times during each vertical sweep. Each horizontal sweep (waveshape F) is five units of time long. A five-pulse counter 215 provides a "1" output when registering a count of 0. This counter is reset to 0 by waveshape C. Another counter 217 which is also reset by waveshape C, provides a "1" output on lead 219 to "and" gate 221 when its count is lower than 8. Waveshape C triggers the first horizontal sweep for the scanner by setting counter 215 to 0, which provides a "1" output through "or" gate 223 to horizontal sweep generator 225. The fifth clock pulse B after waveshape C causes counter 215 to count past its maximum of four and the counter again registers 0, which provides a "1" output to start the second horizontal sweep (see waveshape E). In the same manner, the following horizontal sweeps are initiated. The beginning of the ninth horizontal sweep supplies the eight pulse to counter 217 causing the counter to register 8, which terminates the conditioning gate ("1" output) for "and" gate 221. This terminates the scanner operation by causing a 0 signal on lead 219 to inhibit "and" gate 221, which removes clock pulses B from the input of counter 215.

Waveshape C also sets flip-flop 227 (through "or" gate 223) which conditions "and" gate 229. Clock pulses which are delayed one-half unit by delay 231 are also applied to "and" gate 229. The clock pulses passed by this "and" gate (waveshape G) condition "and" gate 231 to enable it to pass the video output of the phototube 207 at intervals during the sweep of the scanner. Waveshape H shows the approximate video output of the phototube for the input specimen "3." The one half-unit delay 231 cause the phototube output to be sensed as the scanning beam is approximately at the center of each area of matrix 203. Waveshape I indicates the signal present at the output of "and" gate 231 for an input specimen "3."

A counter 233 is reset to "0" by waveshape C. This counter provides two outputs: one at a count of "44" and one at a count of "45." The 45th clock pulse passed by "and" gate 229 provides an output from counter 233 that resets flip-flop 227, thus inhibiting "and" gate 229 and preventing further passage of video by "and" gate 231. Since the counter 233 is read-out to reset flip-flop 227 at a count of "45," there are 45 intervals if time during which the flip-flop is set and "and" gate 229 is conditioned. The forty-five pulses from "and" gate 229 (waveshape G) are also applied to another "and" gate 235. The forty-fifth of these pulses is inhibited by waveshape K, which is a 1½ unit inhibit signal begun by the counter "read-out at 44" (waveshape J). The output of "and" gate 235 is delayed one-half unit by delay 237 to provide a pulse train (waveshape L) that is in phase with the clock pulse (waveshape B).

Two 45-position shift registers 243 and 245 are each reset by waveshape C. The 44 pulses in waveshape L are applied through "or" gates 247 and 249 to shift the registers 44 times. Since the shift pulses (waveshape L) are in phase with the clock pulses (waveshape B), the shifts occur between successive video pulses from "and" gate 231. Thus, one-half unit after the first video signal (from the first area of matrix 204) is passed through "and" gate 231 into the first positions of the shift registers 243 and 245, the first of the 44 shift pulses (waveshape L) shifts this data into the second order of each shift register. Another one-half unit later, the video signal corresponding to the second area of matrix 204 is placed into the lowest-order of each shift register. After 44 successive shifts the 45 video representations of the discrete areas of matrix 203 are stored in each shift register.

Figure 36:
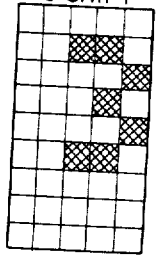
Figure 37:
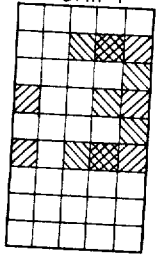
Figure 38:
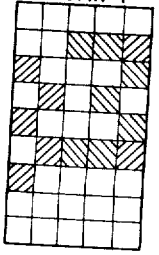
Figure 39:
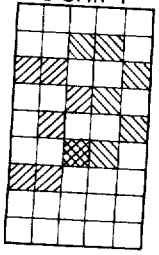
Figure 40:
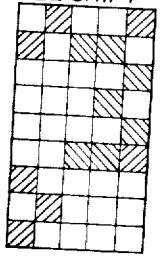
Figure 45A:
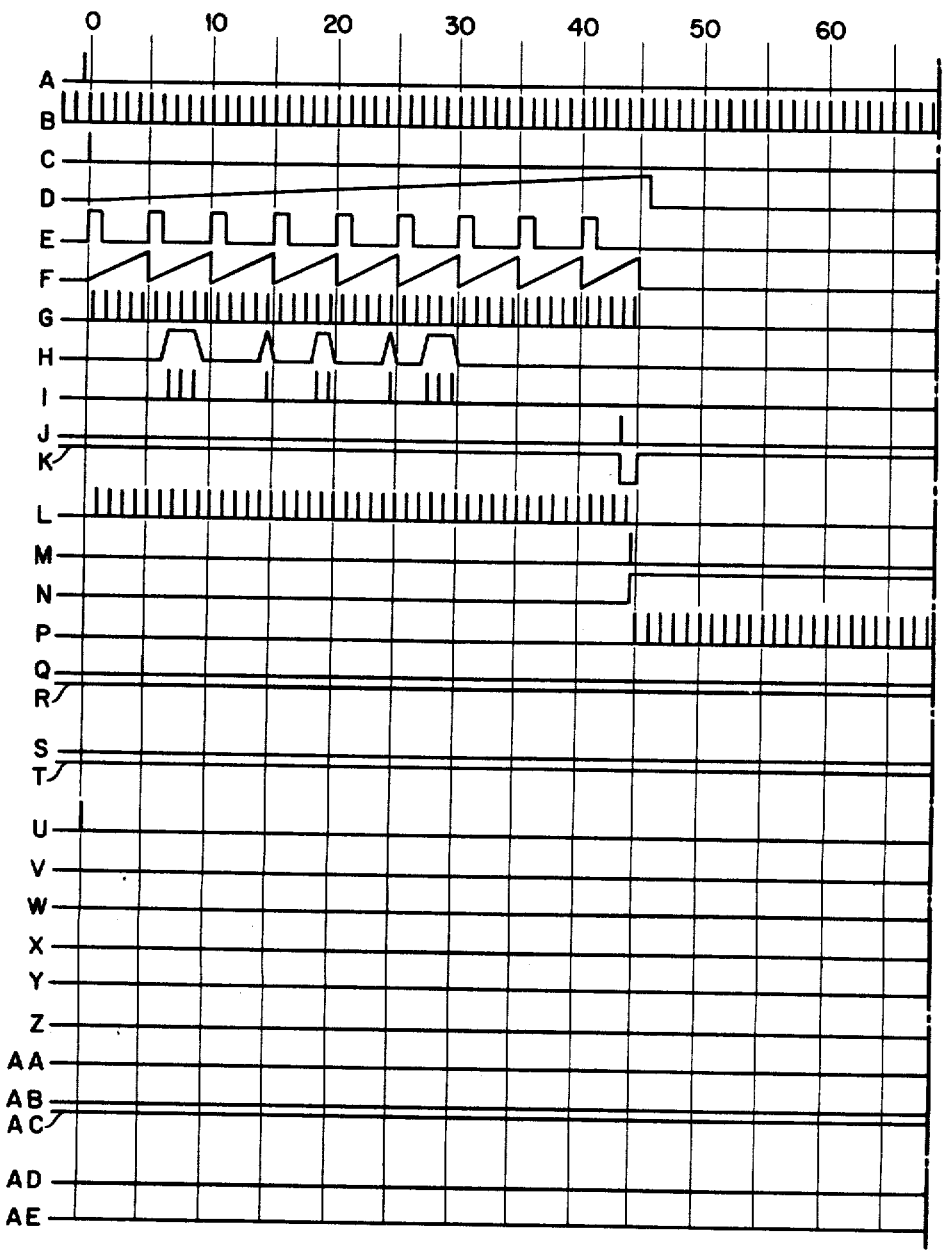
FIGURE 45 is a timing diagram showing the operation of the embodiment shown in FIGURE 35.
Figure 45B:
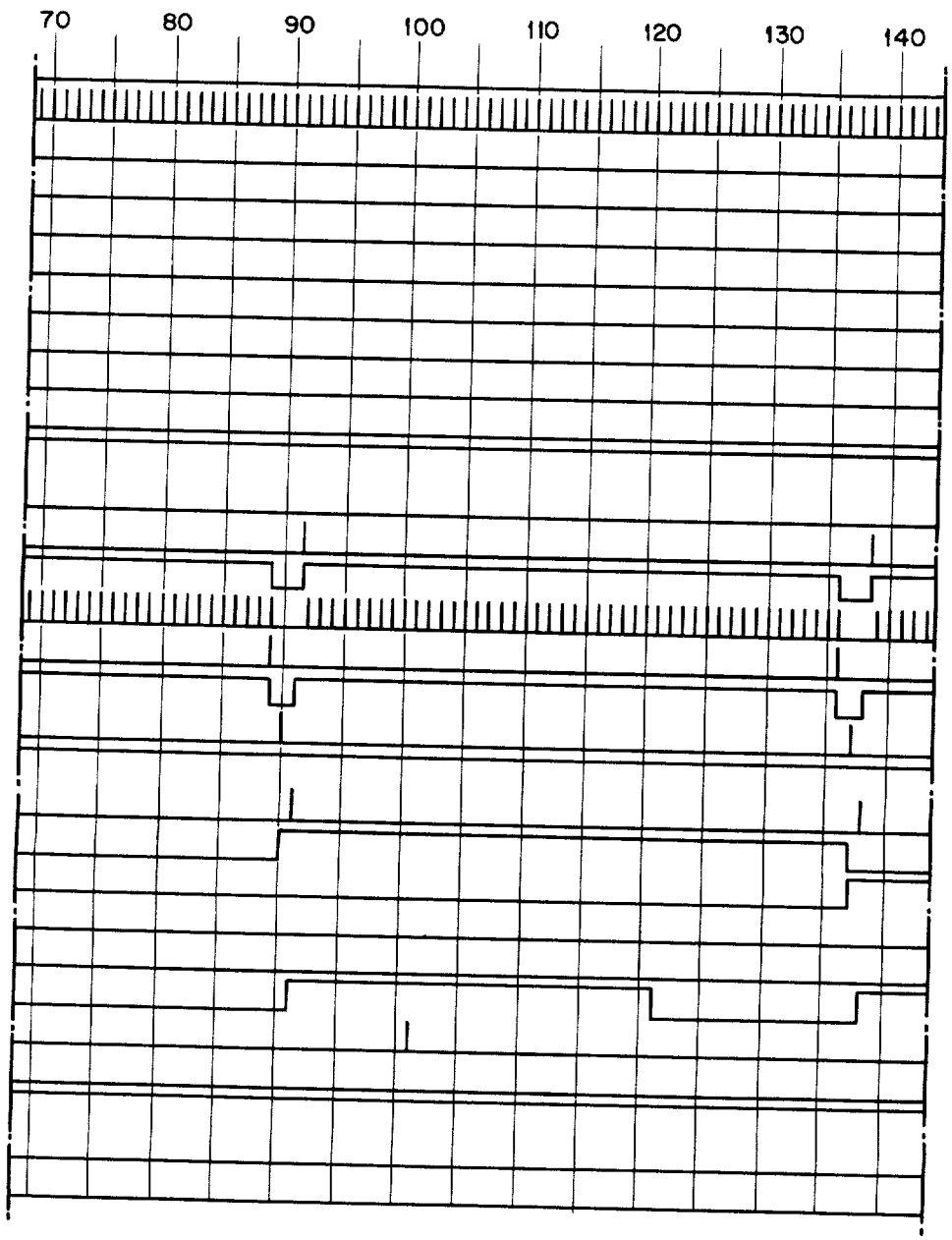
Figure 45C:
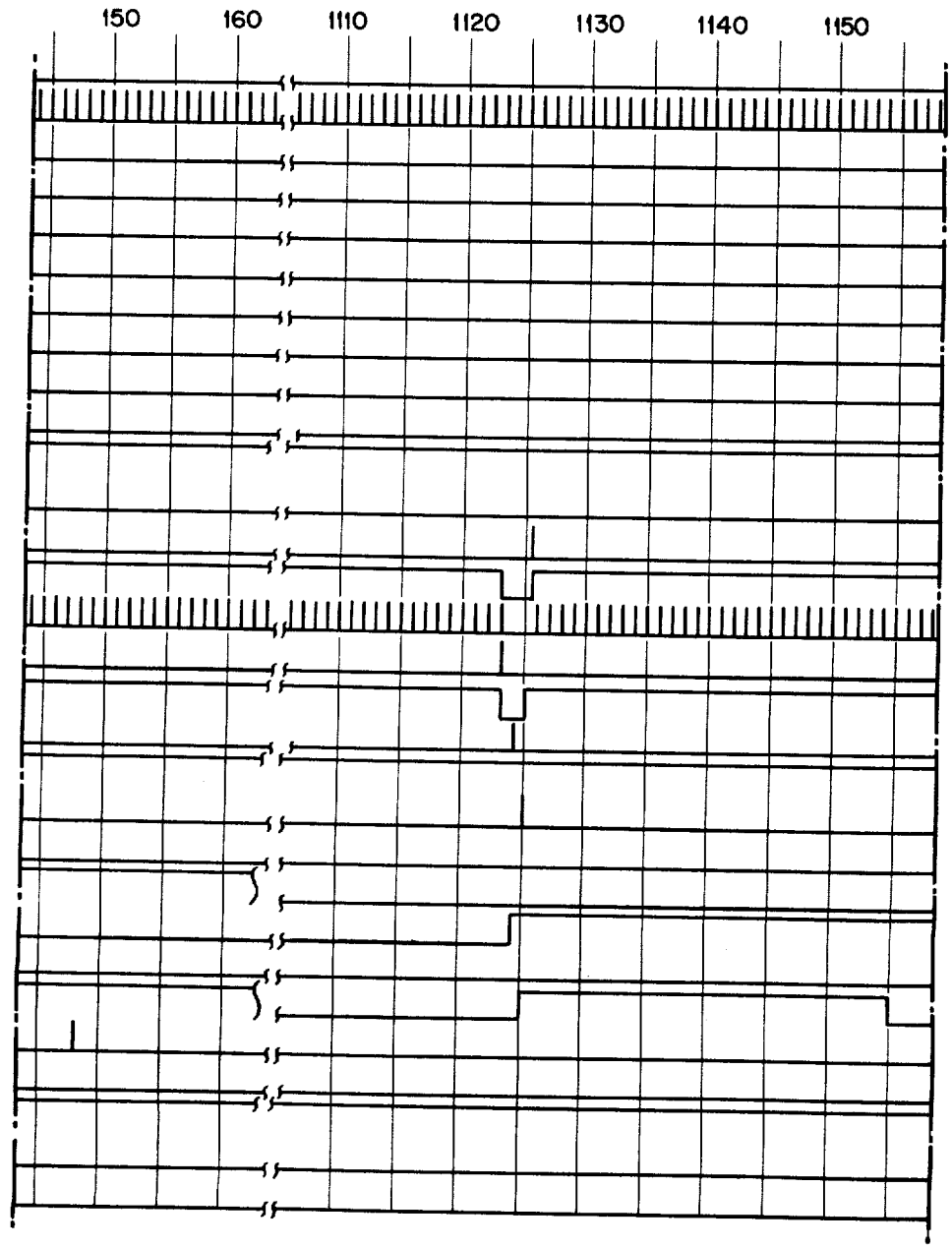
Figure 45D:
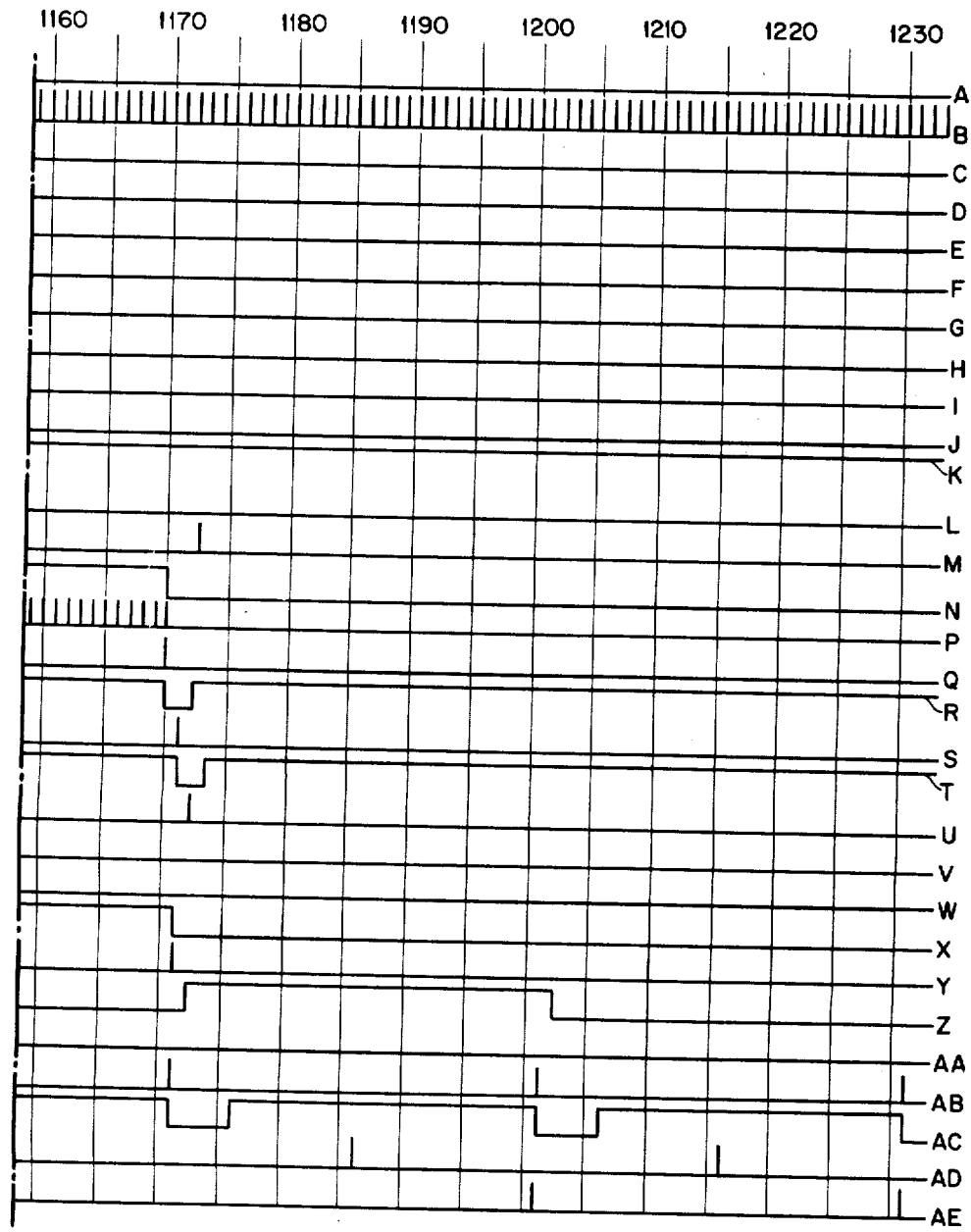

FIGURES 36–43 show the subsequent operation of the shift registers 243 and 245 and their associated circuitry in developing the autocorrelation sums. Following this paragraph will be a detailed electrical description of the operation of the shift registers. Each of FIGURES 36–43 show two 45-bit binary word indicating the bits stored in the shift registers 243 and 245 as the autocorrelation function is generated. The upper binary word is the same in all figures and represents the data in shifting register 243 corresponding to an uncentered input specimen "3" indicated on the matrices in FIGURES 36–43 by "slant-left" lines. The lower binary word indicates the data in shift register 245. This word is obtained by shifting the data in the upper binary word by the amount indicated. The shift registers described are of the recycling type as shown in FIGURE 15, where bits in the last position of the register are shifted into the first position. The "slant-right" lines in the matrices show the positions of the shifted specimen "3" corresponding to the lower binary word. The bits in the upper word are compared with the bits in the lower word and a count made of the number of coincident bits. This count provides the data for the autocorrelation table of FIGURE 44. FIGURE 36 shows the condition of the shift registers during the initial operation, after being filled with the binary data pertaining to the input specimen "3" (as described in the last paragraph). There are seven coincidence bits, providing the "7" at the center (position 0) of FIGURE 44. FIGURE 37 shows the condition of the shift registers during the second operation—the lower binary word is shifted one position. This corresponds to shifting the input specimen to the right one unit. Note the shifted specimen (slant-right lines) on the matrix is partially on the left side of the matrix. There are now two coincident bits (bit number 4 in row 2 and bit number 4 in row 6) providing the "2" at position 1 of FIGURE 44. FIGURE 38 shows the conditions present after two shifts, indicating 0 coincident bits, providing the "0" at position "2" of FIGURE 44. As the shifting is continued (after three shifts) the shifted specimen takes the shape of the "3" on the left side of the matrix, one row lower than the unshifted (short-left lines on the matrix) specimen (FIGURE 39). After three shifts, there is one coincident bit (bit number 3 of row 6), providing the "1" at position 3 of FIGURE 44. Continued shifting provides the remainder of the data for the table in FIGURE 44. FIGURE 40 shows the conditions present after twenty-two shifts. The lower word in FIGURE 40 shows three bits (number 2 and 5 of row 1 and number 1 of row 2) that have entered the left end of the word from the right. The shifted specimen (slant-right lines) has begun to enter at the top of the matrix, corresponding to bits entering the left end of the lower word. There are no coincident bits after twenty-two shifts, providing a "0" at position 22 of the table in FIGURE 44 (corresponding to shifting the specimen to the right two units and down four units). FIGURE 41 shows the conditions that would be present after twenty-three shifts, providing 0 coincident bits. This corresponds to a shift to the left two units and down five units, which is comparable to the shifting to the left two units and up four units, because the matrix has nine rows. On the matrix of FIGURE 41, bit 246 is shifted into bit 248 (left two units and down five units), and bit 250 is shifted into bit 252 (left two units and up four units). The choice of left two units and up four units was made to enable the data to be entered into the table of FIGURE 44 at position 23. The 23rd and all subsequent shifts provide data for the upper portion of the table of FIGURE 44. Due to the symmetry of the table, this data is redundant. FIGURE 40 shows the conditions that would be present after 44 shifts, providing a "2" at position 44 of the table of FIGURE 44. Finally, FIGURE 43 shows that forty-five successive shifts would provide the same result as was obtained before shifting (FIGURE 36). The same autocorrelation results are obtained (FIGURE 44) by this method as were obtained (FIGURE 29) by the more straight forward method outlined with respect to FIGURES 21–28. If input specimens of size "$m$" by "$n$" are to be identified, the input matrix must be of size $2m-1$ by $2n-1$ (or larger).

The operation of the shift registers and their associated circuitry to sequentially develop the 23 non-redundant sums is indicated in the tables of FIGURES 36–43. The sums are accumulated in counter 257 (FIGURE 35$b$). The counter 233 "read-out at 45" is passed through "or" gate 258 (first pulse of waveshape M) and through "and" gate 259 to set flip-flop 261, which provides a conditioning signal (waveshape N) for "and" gate 263. The function of "and" gate 259 is explained below. The succeeding 45 clock pulses are passed through this "and" gate (waveshape P) and through "or" gates 247 and 249 to simultaneously shift each register 243 and 245 forty-five times. Since the output of the 45th position of storage is fed-back to the first position of storage in each shift register, each register returns to its initial condition after the 45 successive shifts. As the registers are shifted, an "and" gate 255 passes count pulse to counter 257 whenever the bits in the 45th order of the register are "1's." Since identical video data is applied to both shift registers, the counter 257 records the sum of video bits during the first stage of operation (as shown in FIGURE 36). The operation of two-unit single shot 277, inverter 279 and "and" gate 281 is explained below.

A 45-pulse counter 265 provides an output waveshape Q which is fed through "or" gate 267 to reset flip-flop 261, thus inhibiting the operation of "and" gate 263 after 45 pulses have passed. As flip-flop 261 is reset, a pulse is applied through "and" gate 269 one-unit single-shot 271. The output of this single-shot conditions "and" gate 273 which passes the subsequent clock pulse. "And" gate 269 is inhibited for one unit of time after the occurrence of waveshape C through the action of one-unit single-shot 283 and inverter 285. This insures that no signal (waveshape S) will be generated when flip-flop 261 is initially reset (by waveshape C).

Waveshape S is applied through "or" gate 249 to shift the data in shift register 245 one position. This corresponds to shifting the pattern 201 on matrix 203 one unit as explained above. FIGURES 37 through 43 illustrate the operation of the shift registers during various data shifts. Waveshape S is also applied through a one-half unit delay 287, "or" gate 258, and "and" gate 259 to set flip-flop 261 for the second phase of operation (waveshape N). Delay 287 insures that the flip-flop 261 is not reset before register 245 is shifted. Thus, the registers 243 and 245 are shifted 45 times to cause a sum of coincidence of "1" signals to be accumulated in counter 257, then counter 245 is shifted one position, and each counter is again shifted 45 times. In this manner, the autocorrelation sums (FIGURE 44) are sequentially obtained.

Waveshape S also conditions "and" gate 295 to pass the accumulated total in counter 257 to the subsequent stages and after a delay of one unit in delay 296 resets counter 257 (waveshape U). This delay 296 insures that the counter 257 output will be passed to the subsequent stages before the counter is reset.

The output of the 45-pulse counter 265 (waveshape Q) initiates the operation of a two-unit single-shot 277 which provides a positive gate to inverter 279. The inverter output (waveshape R) inhibits the operation of "and" gate 281 during the time that shift register 245 is shifted one unit (by waveshape S). This prevents a possibly erroneous signal from being applied through "and" gate 255 to counter 257 during this shift.

A ring counter 298 provides timing for the subsequent circuits. This counter provides a "1" output on only one output lead at a time. The counter is set to its zero output by waveshape C. An output is developed from its first stage (waveshape V) after the first occurrence of waveshape S. Successive inputs step the counter through its 24 positions. Waveshape W is developed by the second input to the ring counter; waveshape X by the 23rd input; and waveshape Y by the 24th input. One of the functions of waveshape Y is to trigger 2-unit single-shot 291 which provides an output through inverter 293 to inhibit "and" gate 259 (waveshape T). This stops the automatic recycling of flip-flop 261 and shift registers 243 and 245 after 23 input character shifts have been completed.

The sums accumulated in counter 257 are passed through "and" gate 295 at the appropriate time to register 297. The number stored in this register is simultaneously applied to a group of multipliers 303 where it is multiplied by a number stored in one-write-read register 299 of each of the ten 23-register groups 301 shown in FIGURES 35c, d and e. The first number stored in register 297 is multiplied by the number stored in the "1" register-0 299 in "1" multiplier 303. This product is stored in the "1" accumulator 327. At the same time, "2" multiplier 303 multiplies the number stored in register 297 by the number stored in "2" register-0 299 and applies the product to the "2" accumulator 327. Simultaneously, the number stored in register 297 is multiplied by the number stored in the appropriate register 299 and the products stored in the appropriate accumulator 327. The second number stored developed by counter 257, indicating the autocorrelation sum for a shift of one unit, is subsequently stored in register 297 and simultaneously multiplied by the number stored in "1" register-1, "2" register-1, etc. through "0" register-1. Ten multipliers are used in this embodiment; one for each of the characters to be identified. If serial multiplications were to be used, only one multiplier would be needed. Since 23 individual autocorrelation sums are computed when a 5 x 9 matrix is used; 23 registers 299 are used in each group 301. The numbers stored in registers 299 are the unnormalized autocorrelation functions of the reference patterns as indicated in the tables in FIGURE 30. The appropriate number for storage in each of the registers in a group is dependent upon the order of generation of sums in counter 257 by the circuit of FIGURE 35a–b and is controlled by a group of "and" gates 313. FIGURE 44 shows the autocorrelation function for the pattern "3" with its elements labelled "0," "1," "2," etc. through "44," indicating their order of generation. The number labelled "0" is placed in "3" register-0, the number labelled "1" is placed in "3" register-1, etc. through "22" which is placed in "3" register-22. All numbers must be doubled except the numbers placed in the "1" register-0, "2" register-0, etc. through "0" register-0 to account for the reflected numbers corresponding to 23, 24, 25 . . . shifts which are not developed by the circuit of FIGURE 35 as they are the same as the numbers developed by the first 22 shifts. The ring counter 298 (FIGURE 35b) controls the timing of the operation of "and" gates 323, insuring that the numbers in the "1" register-0, "2" register-0, etc. are applied to the multipliers 303 after generation of the 0-shift autocorrelation sum; the numbers in the "1" register-1, "2" register-1, etc. are applied after generation of the 1-shift autocorrelation sum; etc. until finally, the numbers in the "1" register-22, "2" register-22, etc. are applied after the 22-shift (final) autocorrelation sum is obtained. Waveshape Q resets register 297 one unit of time before waveshape S conditions "and" gate 295 to pass the accumulated sum from counter 257 to the register. One unit of time later than waveshape S (due to the two unit delay 313 operating on waveshape Q), a 30-unit single-shot 315 provides a conditioning level (waveshape Z) to "and" gate 317. The multiplier outputs are added to the associated accumulators 327 twenty units of time after "and" gate 317 is conditioned due to the action of delay 325. This delay provides time for the multipliers to develop their outputs. The twenty-fourth sum (caused by the twenty-third shift) accumulated in counter 257 is not used. Its development is automatic due to the use of 24 level ring counters 298. This sum is disregarded because only 23 autocorrelation sums are needed with a 5 x 9 input matrix 203. This sum is passed by "and" gate 317 to the multiplier, but there are no registers to provide the second factor required for multiplication, so the product is zero and does not affect the sums in accumulators 327.

Figure 35B:
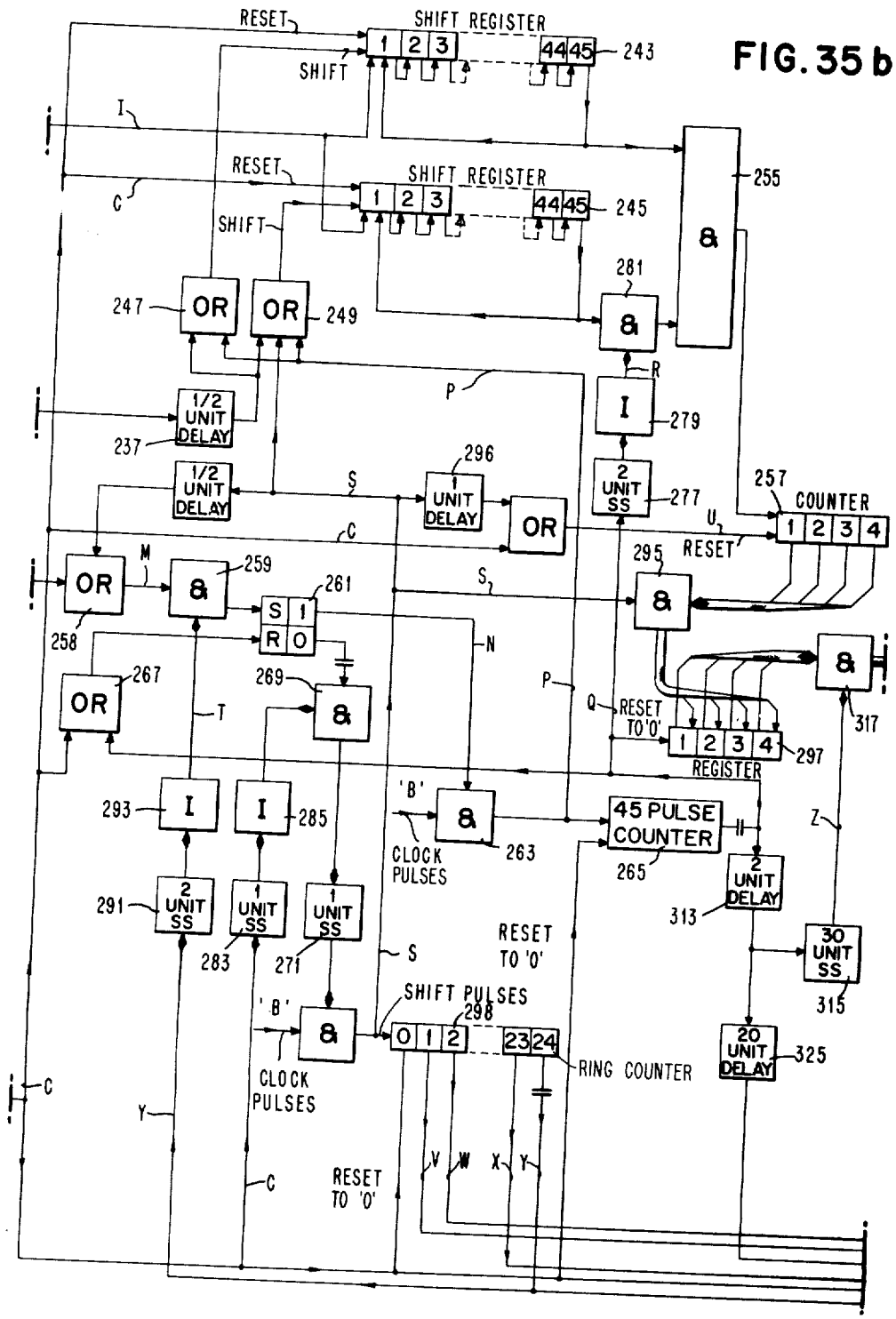
FIGURE 35 is a schematic diagram of the embodiment of the invention shown in FIGURES 1 and 34.
Figure 35C:
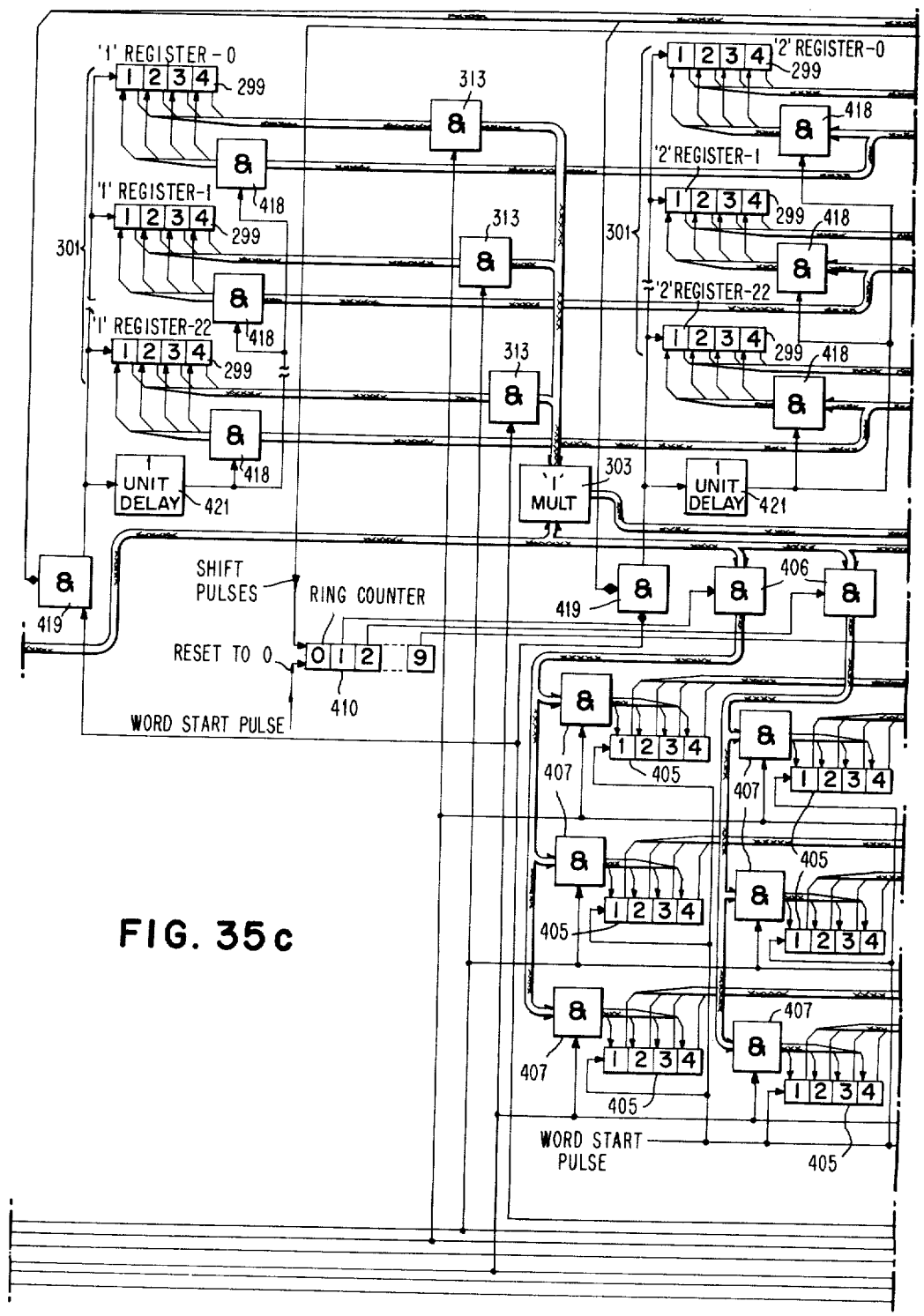
Figure 35F:
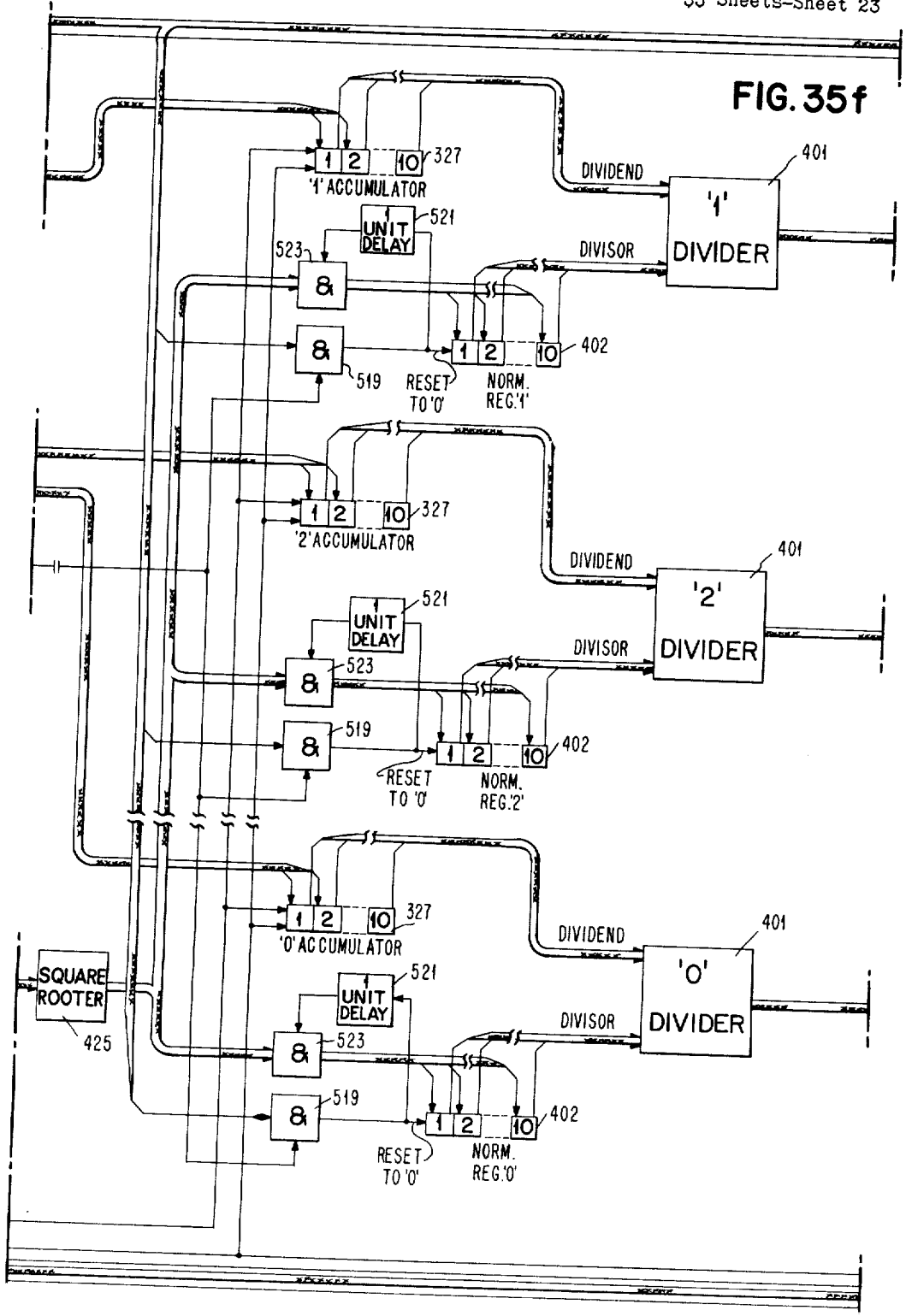

The sums developed in accumulators 327 are normalized by division of $$[\Sigma D_R^2(x', y')]^{1/2}$$

in dividers 401. The normalization factor for each reference is stored in a normalization register 402 (FIGURE 35f). These factors are corrected when the data in reference storage registers 299 is altered as will be described below.

The remainder of the circuitry shown in FIGURES 35c, d and e is related to the adaptive feature of the system and will be described subsequently.

Figure 35H:
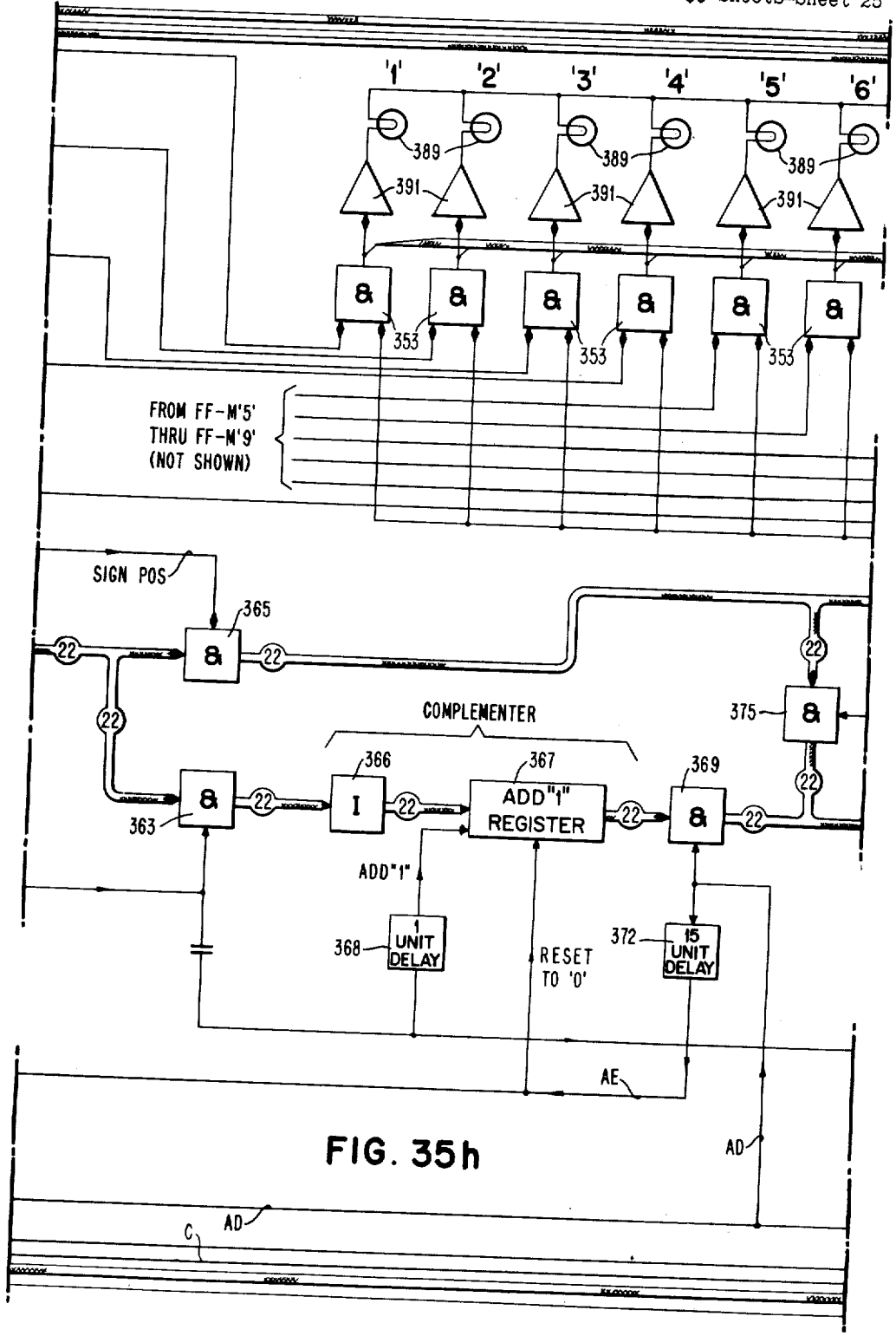
Figure 35I:
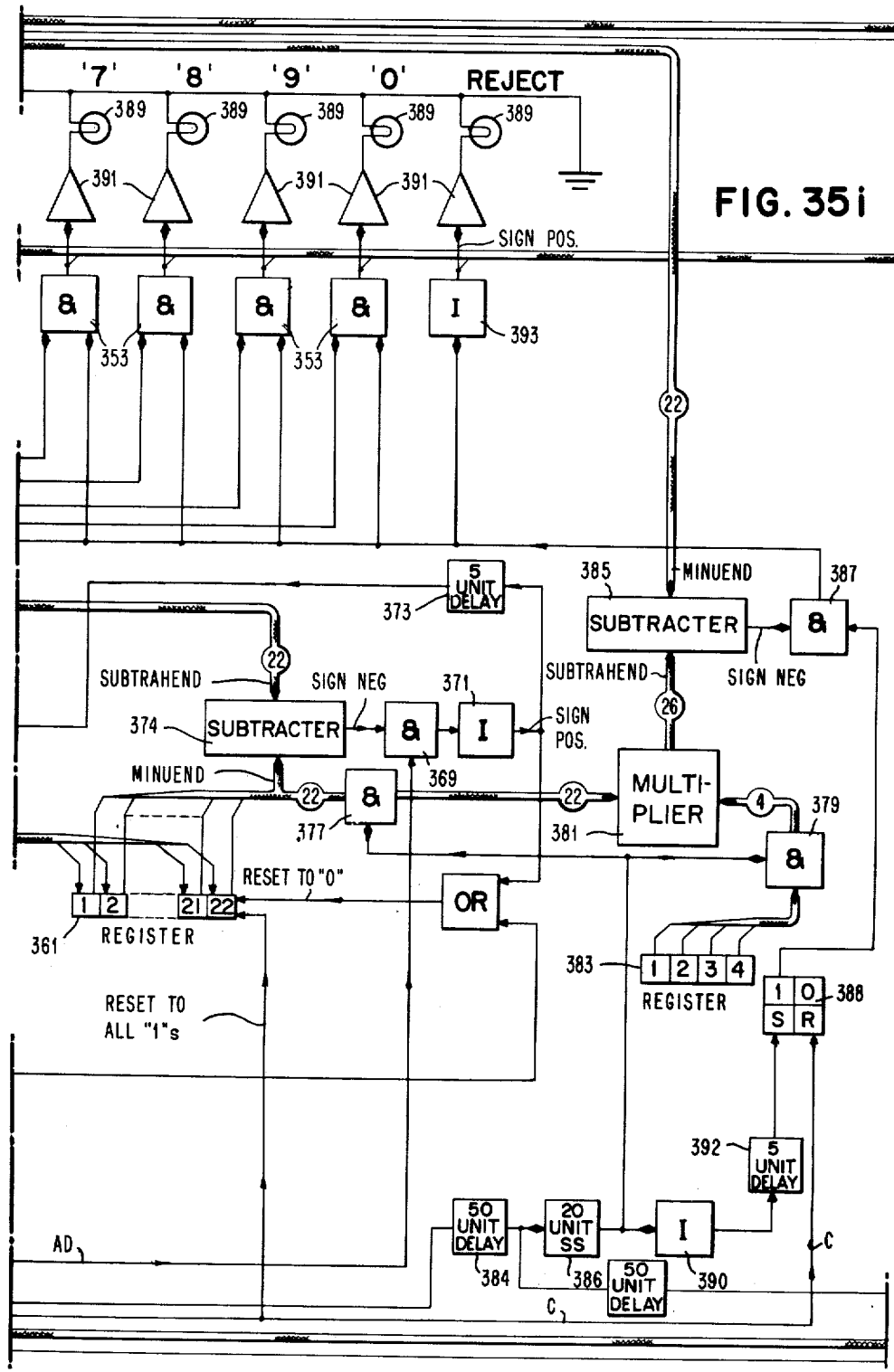

The maximum signal indicator circuits on FIGURES 35g, 35h and 35i have two functions: first, to determine which divider 401 has the largest output signal after the termination of the multiplications and second, to indicate whether the difference between the largest signal and the next-largest signal number is sufficiently great to indicate definite, unambiguous identification.

This determination is made on a ratio basis—a reject is indicated when the second-largest signal is within a preestablished percentage of the largest accumulated sum. Ten minuend flip-flops 331 and nine subtrahend flip-flops 333 control ten minuend "and" gates 335, and nine subtrahend "and" gates 337 respectively. A subtracter 341 sequentially compares the signals from the dividers 401, under the control of the minuend and subtrahend "and" gates 335 and 337. During the first subtraction, the number (signal) from the "2" divider is subtracted from the number from the "1" divider. If the subtrahend is smaller than the minuend (providing a positive difference), the subtrahend is replaced by the number from the "3" divider. This is continued until a subtrahend larger than the minuend develops a negative difference from the subtrahend. If this occurs, the number in the subtrahend is placed in the minuend and the subtrahend contains the number from the next-higher numbered divider. For example, if the "1" divider output is larger than the "2" divider output, but smaller than the "3" divider output, during the first subtraction the number from the "2" divider is subtracted from the number from the "1" divider indicating a positive difference. The number from the "3" divider then becomes the subtrahend of a second subtraction from the number from the "1" divider. Since this subtraction provides a negative difference, the third subtraction uses the number from the "3" divider as the minuend and the number from "4" divider as the subtrahend. This continues until the number from the "0" divider is the subtrahend of a subtraction from a number from one of the other dividers. Since each subtraction that provides a negative remainder causes the subtrahend to become the minuend of the subsequent subtraction, the number in the minuend (after all subtractions are completed) is the largest number from any divider 401.

This procedure is accomplished in the circuitry of FIGURE 35d in the following manner. Waveshape Y from the 24th element of ring counter 298 (FIGURE 35b) sets the M "1" and S "2" flip-flops 331 and 333 which have outputs which condition the M "1" and S "2" "and" gates 335 and 337. These two "and" gates apply the numbers from in the "1" divider to the minuend input of subtractor 341 and the number from the "2" divider to the subtrahend input of the subtracter. The subtracter output is applied through a one-unit delay 343 and an "and" gate 345 to the subsequent circuits. The operation of the one-unit delay and "and" gate will be explained below. Waveshape AE which is developed in the subsequent circuitry provides a pulse to the circuits of FIGURE 35g to indicate that the operations of the subsequent circuitry are completed and the next subtraction is to take place. The generation of waveshape AE will be explained below. The minuend and subtrahend of the next subtraction depends upon whether the result of the previous subtraction was positive or negative. The output of the S "2" fllip-flop 333 is applied to the MC "2" (minuend control) " and" gate 347 and the SC "3" (subtrahend control) "and" gate 349. Waveshape AE is applied to all "and" gates 347 and "and" gates 349. The "sign-negative" lead 351 is applied to all "and" gates 347. The MC "2" "and" gate 347 is conditioned only when the difference of the previous subtraction is negative. Regardless of the sign of the difference of the previous subtraction, SC "3" "and" gate is conditioned. This output sets the S "3" flip-flop 333 and resets the S "2" flip-flop 333. This causes the subsequent subtraction to use the next subtrahend in order. If the difference of any subtraction is negative, in addition to substituting subtrahends, a new minuend is provided. The new minuend is the subtrahend of the previous subtraction, as explained above. In this case, the substitution of minuends is caused by the operation of the MC "1" "and" gate 347 when a negative sign is developed by the first subtraction. This operation continues as described above until the S "0" flip-flop 333 is set, causing the number in the "0" accumulator 327 to be used as a subtrahend of the subtraction. If this subtraction provides a positive difference indicating that the minuend is larger than the subtrahend, the minuend flip-flop 331 that is set during this subtration provides an indication of the largest number in the accumulators 327. If the remainder of the last subtraction is negative, the S "0" flip-flop 333 output, the sign negative signal on lead 351 and waveshape AE cause the MC "0" "and" gate 347 to set minuend flip-flop M "0". Each minuend "and" gate 347 output in addition to setting the appropriate minuend flip-flop 331, provides a reset signal to all lower order minuend flip-flops 331. All minuend flip-flops 331 and subtrahend flip-flop 333 are initially reset by waveshape C. Each minuend flip-flop 331 provides a "1" output to one of "and" gates 353 as an indication of the divider 401 providing the highest output signal (FIGURES 35h and 35i).

"Or" gate 355 (FIGURE 35g) has a pulse output (waveshape AB) as any subtrahend flip-flop is set. The output of the subtrahend flip-flops is converted into a pulse by the operation of capacitors 357. This output is applied through a 15-unit delay 359 to the subsequent circuitry on FIGURE 35h, i and also to 5-unit single-shot 360. The output gate of this single-shot is applied through inverter 363 as waveshape AC to inhibit "and" gate 345. The 5-unit single-shot and associated circuitry inhibits the subtracter output during the time that it is developing its output. One-unit delay circuit 343 overcomes the effect of the inherent delays of "or" gate 355, 5-unit single-shot 360, and inverter 363, insuring that the subtracter output will be inhibited until completely developed.

A comparison circuit, shown primarily on FIGURES 35h, i detects the difference between the largest and second largest divider 401 output signals (FIGURE 35f), and indicates a reject if the ratio between these numbers is insufficient. As each subtraction is performed by subtracter 341, the difference obtained is compared to a difference obtained by previous subtraction and the smaller of these differences is stored for the subsequent comparisons to be made from subsequent subtractions. If the output of subtracter 341 is negative, indicating the subtrahend to be larger than the minuend, the comparison circuit stores the output of subtracter 341. No comparison is necessary in this case, as the smallest difference from the largest number used as a minuend by subtracter 341 up to the time that a negative difference is detected is always the difference between the minuend and subtrahend of the subtraction that caused the negative difference. If, however, the output of subtracter 341 is positive, it is necessary for the comparison circuit to store the difference of this subtraction only if this difference is smaller than any previous difference from the same minuend in subtracter 341. A register 361 (FIGURE 35i) is used as a storage element for the comparison circuit. If the output of subtracter 341 is negative, "and" gate 363 (FIGURE 35h) passes this output to a complementer comprised of a bank of inverters 366 (one for each bit of the twenty-two bit data) and an add "one" register 367. The complementer is necessary because the output of subtracter 341 is in the complement form when negative. It is well known that to convert a number in the "2's" complement to the actual number, it is necessary to invert each bit and add one. The addition on "1" occurs one unit of time after the subtracters 341 output is passed through "and" gate 345 due to the operation of 1-unit delay 368. This delay provides sufficient time for the register 367 to accept its input from inverters 366. The output of the "add-1" register 367 is passed through "and" gate 369 to register 361 at the occurrence of waveshape AD which occurs 15 units of time after waveshape AB due to the operation of delay 369. This delay provides adequate time for the addition of "1" in register 367. Waveshape AE occurs 15 units of time after waveshape AD due to delay 372 and is used to reset register 367 and the previously discussed "and" gates 347 and 349 (FIGURE 35g). If the output of subtracter 341 is positive, "and" gate 365 (FIGURE 35h) is used to pass the subtracter output to the comparison circuit. "And" gate 365 requires a "sign-positive" input which is developed by inverter 370 (FIGURE 35g) from the "sign-negative" output of the subtracter. The output of "and" gate 365 is applied to a subtracter 374 where it is the subtrahend of the subtraction from the number previously stored in register 361. Waveshape C resets register 361 to all "1's" before it is used in the comparison circuits. The only output of subtracter 374 that is used is the sign bit. At the occurrence of waveshape AD, "and" gate 369 passes this output to inverter 371 which generates a "1" signal if the sign of the subtraction is positive. A positive sign at the output of inverter 371 indicates that the new difference obtained from subtracter 341 (FIGURE 35g) is smaller than the number stored in register 361 (FIGURE 35i). This output is delayed by five-unit delay 373 and applied to condition "and" gate 375 (FIGURE 35h). Delay 373 provides adequate time for register 361 to be reset to "0" before storing the new number. "And" gate 375 then passes the output of subtracter 341 to register 361. After all subtractions in subtracter 341 have been terminated, register 361 maintains the difference between the largest and second largest sums from dividers 401. Then, the ratio between the largest and second largest sums is calculated and a determination made whether to accept the largest sum as an indication of the input specimen or to indicate a reject. One function of multiplier 381 is to develop the product of the number stored in register 361 and a reject constant stored in a register 383. This constant is determined by the minimum discrimination tolerance that is acceptable between the largest and next-largest divider 401 outputs. The multiplier inputs are applied for 20 units of time beginning 50 units of time after the S–"9" flip-flop 333 (FIGURE 35e) is set due to the action of delay 384 and single-shot 386. The delay provides adequate time for the last subtraction in subtracter 341 (FIGURE 35g) and stabilization of the comparison circuits on FIGURES 35g and 35h; the single-shot 386 provides sufficient time for multiplier 381 operation. The result of this multiplication is used as the subtrahend of the subtraction in subtracter 385 from the largest divider 401 output. The only output of subtracter 385 that is used is the sign of the difference. If this sign is negative, indicating that the difference stored in register 361 is larger (after multiplication by the constant stored in register 383) than the largest sum from a divider 401, no reject is indicated. The "sign-negative" output of subtracter 385 is passed by "and" gate 387 to "and" gates 353 to condition them, providing an indication of the input specimen by way of lighting one of a group of lamps 389. A flip-flop provides the conditioning signal for "and" gate 387 while it is set. The flip-flop is set five units of time after the termination of the multiplier conditioning gate generated by single-shot 386 due to the action of an inverter 390 and a delay 392. The flip-flop is reset by waveshape C. Amplifiers 391 provide the required power to operate the lamps. If the output of the subtracter 385 is positive indicating an insufficient difference between the largest and second-largest divider 401 outputs, the output of "and" gate 387 inhibits the operation of "and" gates 353. In this case, an inverter 393 provides a "1" output to operate a reject lamp 389.

Figure 35J:
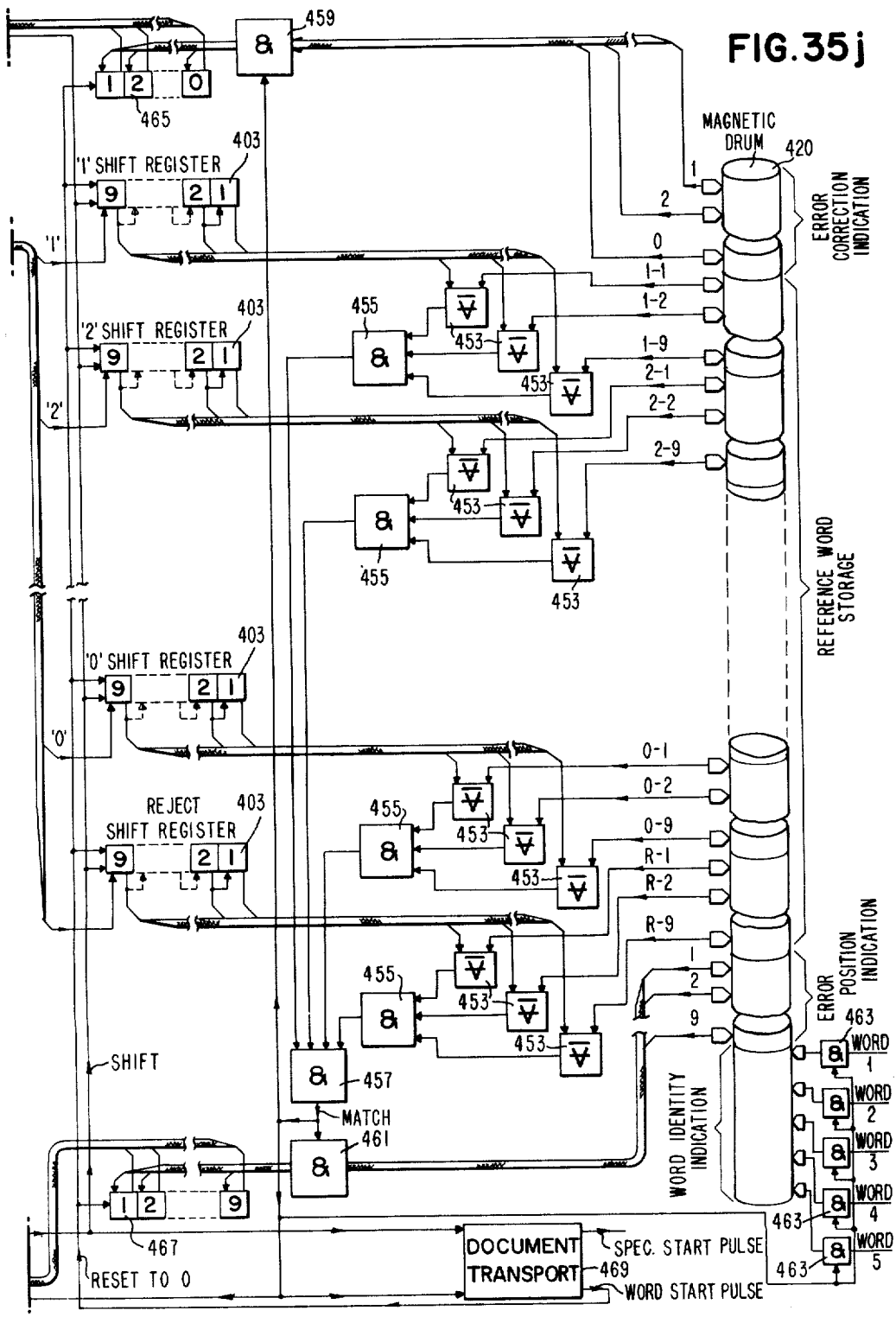

The outputs of "and" gates 353 and inverter 393, which are indicative of the identity of the specimen (or a reject), are each applied to a shift register 403 (FIGURE 35j). These registers are reset prior to the scanning of each word by a "word start pulse" generated by the document transport mechanism. The output of the 50-unit delay 384 (FIGURE 35i) is further delayed by another 50-unit delay 451 and used to shift the data in register 403. This second delay provides adequate time for the multiplier 381, subtracter 385, and their associated circuits to supply an indication of the identity of the specimen (or a reject indication) to the registers 403 before they are shifted.

The invention is embodied in FIGURE 35 to identify words comprised of sequences of numbers, and more particularly "social security" numbers. These nine-digit numbers are assigned to employees by the government in a manner that results in a considerably random distribution among employees of any give concern. Since the number of employees in the concern represents a minute fraction of the number of assigned social security numbers, a system for identifying these numbers may be highly redundant, allowing the numbers to be identified accurately even though one or more digits are incorrectly identified or rejected. This application of the invention is only typical of the numerous uses to which it may be put, including the identification of words, stock numbers, etc.

The application of the invention to be described in detail is based on the identification of five 9 digit words (numbers):

WORD 1 ---------------------------------- 119269437
WORD 2 ---------------------------------- 147889217
WORD 3 ---------------------------------- 105449104
WORD 4 ---------------------------------- 699329198
WORD 5 ---------------------------------- 114279684

For the sake of simplicity, the embodiment is designed to correctly identify words which have, at most, one incorrectly identified or rejected specimen. Further circuit simplicity is achieved by limiting the permissible errors to substitution errors between the pairs 2–6 and 3–5. These errors are among those most likely to occur, as determined by the chart in FIGURE 31, and it would be obvious to extend the invention to include correction of other errors. The following chart indicates the tolerable variations of the five words shown above that are correctly identified. The error positions and corrections, if any, and the identity of the word are also shown. The words are shown in numerical order where R corresponds to a reject and is considered to a number higher than 9.

| Reference Word Storage | Error Position | Error Correction | Word Identity |
|---|---|---|---|
| 103449104 | 3 | 5 | 3 |
| 105149104 | | | 3 |
| 10544910R | 9 | 4 | 3 |
| 1054491R4 | 8 | 0 | 3 |
| 105449R04 | 7 | 1 | 3 |
| 10544R104 | 6 | 9 | 3 |
| 1054R9104 | 5 | 4 | 3 |
| 105R49104 | 4 | 4 | 3 |
| 10R449104 | 3 | 5 | 3 |
| 114279284 | 7 | 6 | 3 |
| 114279684 | | | 5 |
| 11427968R | 9 | 4 | 5 |
| 1142796R4 | 8 | 8 | 5 |
| 114279R84 | 7 | 6 | 5 |
| 11427R684 | 6 | 9 | 5 |
| 1142R9684 | 5 | 7 | 5 |
| 114679684 | 4 | 2 | 5 |
| 114R79684 | 4 | 2 | 5 |
| 119229437 | 4 | 6 | 5 |
| 119269437 | | | 1 |
| 119269457 | 8 | 3 | 1 |
| 11926943R | 9 | 7 | 1 |
| 1192694R7 | 8 | 3 | 1 |
| 119269R37 | 7 | 4 | 1 |
| 11926R437 | 6 | 9 | 1 |
| 1192R9437 | 5 | 6 | 1 |
| 119669437 | 4 | 2 | 1 |
| 119R69437 | 4 | 2 | 1 |
| 11R269437 | 3 | 9 | 1 |
| 11R279684 | 3 | 4 | 5 |
| 147889217 | | | 2 |
| 147889617 | | | 2 |
| 14788921R | 7 | 2 | 2 |
| 1478892R7 | 9 | 7 | 2 |
| 147889R17 | 8 | 1 | 2 |
| 14788R217 | 7 | 2 | 2 |
| 1478R9217 | 6 | 9 | 2 |
| 147R89217 | 5 | 8 | 2 |
| 14R889217 | 4 | 8 | 2 |
| 1R4279684 | 3 | 7 | 5 |
| 1R5449104 | 2 | 1 | 5 |
| 1R7889217 | 2 | 0 | 3 |
| 1R9269437 | 2 | 4 | 2 |
| 299329198 | 1 | 6 | 1 |
| 699329198 | | | 4 |
| 699329198 | | | 4 |
| 699329R98 | 9 | 8 | 4 |
| 6993291R8 | 8 | 9 | 4 |
| 699329R98 | 7 | 1 | 4 |
| 69932R198 | 6 | 9 | 4 |
| 699369198 | 5 | 2 | 4 |
| 6993R9198 | 5 | 2 | 4 |
| 699529198 | 4 | 3 | 4 |
| 699R29198 | 4 | 3 | 4 |
| 09R329198 | 3 | 9 | 4 |
| 6R9329198 | 2 | 9 | 4 |
| R05449104 | 1 | 1 | 3 |
| R14279684 | 1 | 1 | 5 |
| R19269437 | 1 | 1 | 1 |
| R47889217 | 1 | 1 | 2 |
| R99329198 | 1 | 6 | 4 |

Each row of the above chart is indicative of the data stored in parallel in the reference storage circuit which is shown as a magnetic drum 420 in FIGURE 35j. The uppermost portion of the drum contains ten tracks and provides a signal indicative of the correct identity of the incorrectly-identified (or rejected) specimen. The reference words are stored in parallel on 99 tracks comprising nine tracks for each of the ten digits and nine reject tracks. Each track in a group of nine tracks corresponds to the position of the digit in the word. Nine tracks are provided for error position indication, each corresponding to a position in the word. Five word identity tracks are used to generate a signal indicative of the identity of the word. Thus, the magnetic drum 420 contains the data shown in each line of the above chart in parallel along a line parallel to its axis. For example, the first row of the chart is stored: by a data bit in the fifth track of the error correction section, indicating the correct identity of the incorrectly-identified specimen to be a 5; by data bits in the reference word storage section in tracks 1–1, 1–7, 3–3, 4–4, 4–5, 4–9, 9–6, 0–2 and 0–8 corresponding to specimen identified as "1" in positions 1 and 7, etc.; by a data bit in the third track of the error position section indicating an error in identifying the third specimen in the word; and by a data bit in the third track of the word identity section indicating the identity of the specimen word to be "word 3," or 105449104. Obviously, this data could be stored combinationally using less tracks but for simplicity this has not been done in the embodiment shown in FIGURE 35.

The reference word data bits (in the magnetic drum 420) are compared to the specimen word data bits (in the shift registers 403) in a group of "inverted exclusive-or" circuits 453 designated by the symbol $\bar{\forall}$. Each of these circuits produces a "1" output signal when its two inputs are the same (either both "1" or both "0") and a "0" output signal when its two inputs are dissimilar (one a "1" and one "0"). The output signals from the inverted "1" and one "0"). The output signals from the inverted exclusive-or circuits 453 are applied through a group of "and" gates 455 to an "and" gate 457 which generates a "1" output only when the output of each inverted exclusive-or circuit is a "1" signal. This signal indicates a "match" between the specimen word and a reference word and is used to condition "and" gates 459, 461 and 463. At this time during the rotation of the drum 420, the error correction and identity data are sampled by the "and" gates 459 and 461 and applied to alter the reference storage in registers 299 (FIGURES 35c and e) if there is an incorrectly-identified specimen in the word, and the identity of the specimen word is provided by "and" gates 463 (FIGURE 35j) as the system output. The error correction and position is temporarily stored in registers 465 and 467 respectively. These registers are reset by a signal before each word is scanned.

The signal from delay 451 (FIGURE 35i) is applied to the document transport mechanism, shown as a block 469, to cause it to begin scanning the next specimen in a word. Similarly, the "match" indication from "and" gate 457 is applied to the document transport mechanism to cause this device to begin scanning another word. The document transport mechanism supplies the specimen start pulse (used on FIGURE 35a) and the word start pulse (used on FIGURE 35c and j) to synchronize the operation of the identification system with the movement of the document.

The data in the reference storage registers 299 (FIGURES 35c and e) is altered when a specimen is incorrectly-identified. In the embodiment shown in FIGURE 35, this alteration consists of a complete replacement of data. The autocorrelation function of each specimen in the word is stored in registers 405 (FIGURES 35c and d) under the control of "and" gates 406 and 407. A ring counter 410 is reset to 0 by the word start pulse generated by the document transport device 469 (FIGURE 35j). A signal is shifted through this counter after each specimen is identified by a signal from the 50-unit delay 501 (FIGURES 35i and j). This signal sequentially conditions "and" gates 406 to cause the autocorrelation function of each specimen in the word to be distinguished and directed to the appropriate column of "and" gates 407. The autocorrelation function is then further divided into its elements by "and" gates 407, each group of which is sequentially conditioned by signals from ring counter 298 (FIGURE 35b). Thus, each element of the autocorrelation function of each specimen in the word is separately stored in a register 405.

The error correction indication from register 465 (FIGURE 35j) and the error position indication from register 467 (FIGURE 35j) are used to condition "and" gates 313 (FIGURES 35c, d and e) and "and" gates 417 (FIGURES 35c, d and e), respectively, to select the appropriate reference storage registers 299 to be altered and the appropriate data (in registers 405) to be used for the alteration. The error correction signal is applied to condition an "and" gate 419 which then passes a pulse to reset the corresponding registers 299 to "0." This pulse occurs after the specimen is identified and is supplied by the 50-unit delay 501 (FIGURES 35i and j). The output of each "and" gate 419 is also applied through a 1-unit delay 421 to condition a corresponding group of "and" gates 418. The 1-unit delay provides adequate time for resetting registers 299. The conditioned group of "and" gates 418 then pass the elements of the autocorrelation function of the incorrectly-identified specimen to the selected group of registers 299. This function is selected from the data stored in registers 405 by "and" gates 417 which are conditioned by the error position data from register 467 (FIGURE 35j). Thus, the position of the error is used to select the autocorrelation function of the incorrectly-identified specimen which is applied to replace the data in the register 299 which corresponds to the correct identity of this specimen.

The inventive concept of altering the references in a word identification system when specimens are incorrectly identified has been shown and described with respect to a system utilizing autocorrelation function comparison. When identified words are found to contain incorrectly-identified specimens (characters), the references corresponding to the correct identities of these specimens are altered. In this manner, changes in specimen font and quality are continuously reflected in the system reference storage to provide a versatile system which adapts itself to input changes.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A specimen identification apparatus for identifying a specimen word based on its similarity to reference words containing reference patterns comprising, in combination:

input means including a surface light scanning device, and a light-sensitive device having an output signal $f(x, y)$ indicative of each specimen in the word;

means responsive to the output signal $f(x, y)$ for generating an autocorrelation function $D_S(x', y')$ of each specimen indication $f(x, y)$;

means for storing autocorrelation functions $D_R(x', y')$ of each of a plurality of reference patterns R;

means responsive to the functions $D_S(x', y')$ and $D_R(x', y')$ for developing the normalized sum of the point-by-point products of the autocorrelation function of each specimen in the word and the autocorrelation function of each reference pattern according to $$\frac{\sum_{x',y'} D_S(x', y') \cdot D_R(x', y')}{\left[\sum_{x',y'} D_R^2(x', y')\right]^{1/2}}$$

means responsive to the generated normalized sums for providing an indication of the reference pattern which corresponds to the largest of the sums, which is indicative of the identity of a specimen, for each specimen;

means responsive to the indications of the corresponding reference patterns for generating an indication of the identity of the specimen word and, when the identified word contains an incorrectly-identified specimen, for generating an indication of the correct identity of the specimen;

and means responsive to the indication of the correct identity of the incorrectly-identified specimen for altering the stored reference pattern functions that correspond to the correct identity of specimen to cause the reference pattern to be more closely related to the specimen.

2. A specimen identification apparatus for identifying a specimen word based on its similarity to reference words containing reference patterns comprising, in combination:

means for generating electronic indications of discrete portions of functions of the autocorrelation function of each specimen in the word;

means for storing electronic indications of corresponding discrete portions of functions of the autocorrelation functions of each of a plurality of reference patterns;

means responsive to the generated specimen indications and stored reference pattern indications for multiplying the portions of the function of the autocorrelation function of each specimen by the corresponding portion of the function of the autocorrelation function of each reference;

means responsive to the output of the multiplying means for separately accumulating the products for each reference and specimen;

means responsive to the output of the accumulating means for providing an indication of the reference pattern which corresponds to the largest accumulation for each specimen, which is indicative of the identity of the specimen;

means responsive to the indications of the corresponding reference patterns for generating an indication of the identity of each specimen word and, when the identified word contains an incorrectly-identified specimen, for generating an indication of the correct identity of the specimen;

and means responsive to the indication of the correct identity of the incorrectly-identified specimen for altering the stored reference pattern functions that correspond to the correct identity of specimen to cause the reference pattern to be more closely related to the specimen.

3. An adaptive apparatus for identifying a specimen word based on its similarity to reference words containing reference patterns comprising, in combination:

means for storing data corresponding to reference patterns;

means responsive to the stored reference data for identifying each specimen in the word by generating an indication of the identity of the reference pattern that is most similar to each specimen;

means responsive to indications of the identity of the reference patterns for generating an indication of the identity of the specimen word and, when the identified word contains an incorrectly-identified specimen, for generating an indication of the correct identity of the specimen;

and means responsive to the indication of the correct identity of the incorrectly-identified specimen for altering the stored reference pattern data that correspond to the correct identity of the specimen to cause the reference pattern to be more closely related to the specimen.

4. An adaptive apparatus for identifying a specimen word based on its similarity to reference words containing reference patterns comprising, in combination:

means for generating a function of each specimen in the word;

means for storing data corresponding to functions of reference patterns;

means responsive to the generated functions of the specimens and the stored reference data for identifying each specimen in the word by generating an indication of the identity of the reference pattern that is most similar to each specimen;

means responsive to indications of the identity of the reference patterns for generating an indication of the identity of the specimen word and, when the identified word contains an incorrectly-identified specimen, for generating an indication of the correct identity of the specimen;

and means responsive to the indication of the correct identity of the incorrectly-identified specimen for altering the stored reference pattern data that correspond to the correct identity of the specimen to cause the reference pattern to be more closely related to the specimen.

5. The apparatus described in claim 4, wherein the functions are autocorrelation functions.

6. The apparatus described in claim 4, wherein the functions are functions of autocorrelation functions.

7. An adaptive apparatus for identifying a specimen word based on its similarity to reference words containing reference patterns comprising, in combination:

means for generating a function of each specimen in the word;

means for storing data coresponding to functions of reference patterns;

means responsive to the generated functions of the specimens and the stored reference data for identifying each specimen in the word by generating an indication of the identity of the reference pattern that is most similar to each specimen;

means responsive to indications of the identity of the reference patterns for generating an indication of the identity of the specimen word and, when the identified word contains an incorrectly-identified specimen, for generating an indication of the correct identity of the specimen;

and means responsive to the indication of the correct identity of the incorrectly-identified specimen for substituting functions of the incorrectly-identified specimens for the stored reference pattern data that corresponds to the correct identity of the specimen.

8. The apparatus described in claim 7, wherein the functions are autocorrelation functions.

9. The apparatus described in claim 7, wherein the functions are functions of autocorrelation functions.

10. An adaptive apparatus for identifying a specimen word based on its similarity to reference words containing reference patterns comprising, in combination:

means for storing data corresponding to reference patterns;

means responsive to the stored reference data for identifying each specimen in the word by generating an indication of the identity of the reference pattern that is most similar to each specimen;

means responsive to indications of the identity of the reference patterns for generating an indication of the identity of the specimen word and, when the identified word contains an incorrectly-identified specimen, for generating an indication of the correct identity of the specimen;

and means responsive to the indication of the correct identity of the incorrectly-identified specimen for substituting functions of the incorrectly-identified specimens for the stored reference pattern data that corresponds to the correct identity of the specimen.

References Cited in the file of this patent

UNITED STATES PATENTS 3,064,249     Forbath et al. _____ Nov. 13, 1962

OTHER REFERENCES

Horwitz et al.: Pattern Recognition Using Autocorrelation, Proceedings of the IRE, January 1961, (pp. 175–185).